United States Patent
Vinciarelli

(10) Patent No.: US 7,408,795 B2
(45) Date of Patent: Aug. 5, 2008

(54) ENERGY STORAGE AND HOLD-UP METHOD AND APPARATUS FOR HIGH DENSITY POWER CONVERSION

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 230 days.

(21) Appl. No.: 11/110,091

(22) Filed: Apr. 19, 2005

(65) Prior Publication Data
US 2005/0254272 A1 Nov. 17, 2005

Related U.S. Application Data

(63) Continuation-in-part of application No. 10/959,779, filed on Oct. 6, 2004, now Pat. No. 7,212,419, which is a continuation-in-part of application No. 10/785,465, filed on Feb. 24, 2004, now Pat. No. 7,170,764.

(51) Int. Cl.
*H02M 7/00* (2006.01)
*G05F 1/40* (2006.01)

(52) U.S. Cl. ........................... 363/125; 323/265

(58) Field of Classification Search .............. 363/65, 363/67–70, 84, 89, 125, 127; 323/265, 282; 307/82, 83, 85–87, 113, 116, 125, 126, 130, 307/131
See application file for complete search history.

(56) References Cited

U.S. PATENT DOCUMENTS 4,533,986 A  8/1985  Jones (Continued)

OTHER PUBLICATIONS

Baker, "High Frequency Power Conversion With FET-Controlled Resonant Charge Transfer," PCI Proceedings, Apr. 1983.

(Continued)

*Primary Examiner*—Matthew V Nguyen
(74) *Attorney, Agent, or Firm*—Fish & Richardson P.C.

(57) ABSTRACT

A method and apparatus for adaptively configuring an array of voltage transformation modules is disclosed. The aggregate voltage transformation ratio of the adaptive array is adjusted to digitally regulate the output voltage for a wide range of input voltages. An integrated adaptive array having a plurality of input cells, a plurality of output cells, or a plurality of both is also disclosed. The input and output cells may be adaptively configured to provide an adjustable transformer turns ratio for the adaptive array or in the case of an integrated VTM, an adjustable voltage transformation ratio for the integrated VTM. A controller is used to configure the cells and provide digital regulation of the output. A converter having input cells configured as a complementary pair, which are switched out of phase, reduces common mode current and noise. Series connected input cells are used for reducing primary switch voltage ratings in a converter and enabling increased operating frequency or efficiency. An off-line auto-ranging power supply topology is disclosed. An auto-ranging converter module ("ACM") includes 2 or more input cells magnetically coupled to an output cell providing auto-ranging, isolation, and voltage transformation. The ACM converts a rectified line voltage to a low DC bus voltage. The topology allows regulation and power factor correction to be provided at a low voltage increasing energy density and efficiency and reducing cost. A fully integrated PCM may also include a hold-up circuit, a DC input, and a power regulator with or without power factor correction. A PCM with PFC may combine the hold-up and smoothing capacitors for further increases in power density.

9 Claims, 15 Drawing Sheets

U.S. PATENT DOCUMENTS

| | | | |
|---|---|---|---|
| 4,648,017 | A | 3/1987 | Nerone |
| 4,841,220 | A | 6/1989 | Tabisz et al. |
| 4,853,832 | A | 8/1989 | Stuart |
| 4,855,888 | A | 8/1989 | Henze et al. |
| 4,860,184 | A | 8/1989 | Tabisz et al. |
| 4,931,716 | A | 6/1990 | Jovanovic et al. |
| 5,508,905 | A | 4/1996 | Reichard |
| 5,615,093 | A | 3/1997 | Nalbant |
| 5,625,545 | A | 4/1997 | Hammond |
| 5,767,660 | A | 6/1998 | Schmidt |
| 5,786,992 | A | 7/1998 | Vinciarelli et al. |
| 5,999,417 | A | 12/1999 | Schlecht |
| 6,222,742 | B1 | 4/2001 | Schlecht |
| 6,340,851 | B1 | 1/2002 | Rinaldi et al. |
| 6,388,905 | B2 * | 5/2002 | Nakagawa .................... 363/72 |
| 6,424,549 | B1 * | 7/2002 | Gattavari et al. .............. 363/89 |
| 6,511,764 | B1 | 1/2003 | Marten |
| 6,608,770 | B2 | 8/2003 | Vinciarelli |
| 6,753,622 | B2 * | 6/2004 | Oughton, Jr. ................. 307/64 |
| 6,788,033 | B2 | 9/2004 | Vinciarelli |
| 6,853,167 | B2 * | 2/2005 | Elek et al. .................... 323/207 |
| 6,856,283 | B2 | 2/2005 | Jacobson et al. |
| 6,992,907 | B2 | 1/2006 | Zhang |
| 7,061,212 | B2 * | 6/2006 | Phadke ....................... 323/222 |
| 7,106,607 | B2 * | 9/2006 | Nielsen ....................... 363/142 |

OTHER PUBLICATIONS

Bo Yang et al., "LLC Resonant Converter for Front End DC-DC Conversino," CPES Seminar 2001, Blacksburg, VA, Apr. 2001.

Bo Yang et al., "Low Q Characteristic of Series Resonant Converter and Its Application," CPES Seminar 2001, Blackburg, VA, Apr. 2001.

Divan, "Design Considerations for Very High Frequency Resonant Mode DC/DC Converters," IEEE Transactions on Power Electronics, vol. PE-2, No. 1, Jan. 1987.

Erickson and Maksimovic, "fundamentals of Power Electronics," 2$^{nd}$ Edition, Kluwer Academic Publishers, 2001.

Hua et al., "Novel Zero-Voltage Transition PWM Converters," IEEE Transactions on Power Electronics, vol. 9, No. 2, Mar. 1994, p. 605.

Mweene et al, "A High-Efficiency 1.5 kW, 390-50V Half-Bridge Converter Operated at 100% Duty Ratio," APEC '92 Conference Proceedings, 1992, pp. 723-730.

Palz, "Stromversorgung von Satelliten—Wanderfeldröhren hoher Leistung," ("Power Supply for Satellites—High Capacity Traveling-Wave Tubes"), Siemens Zeitschrift, vol. 48, 1974, pp. 840-846 (with English translation).

Severns and Bloom, "Modern DC-to-DC Switchmode Power Conversion Circuits," ISBN 0-442-2396-4, pp. 78-111.

Severns and Bloom, *ibid*, at, *e.g.*, pp. 114-117, 136-139.

Steigerwald, "A Comparison of Half-Bridge Resonant Converter Topologies," IEEE Transactions on Power Electronics, vol. 2, No. 2, Apr. 1988.

SynQor, "Preliminary Tech Spec, Narrow Input, Isolated DC/DC Bus Converter," SynQor Document No. 005-2BQ512J, Rev. 7, Aug. 2002.

* cited by examiner

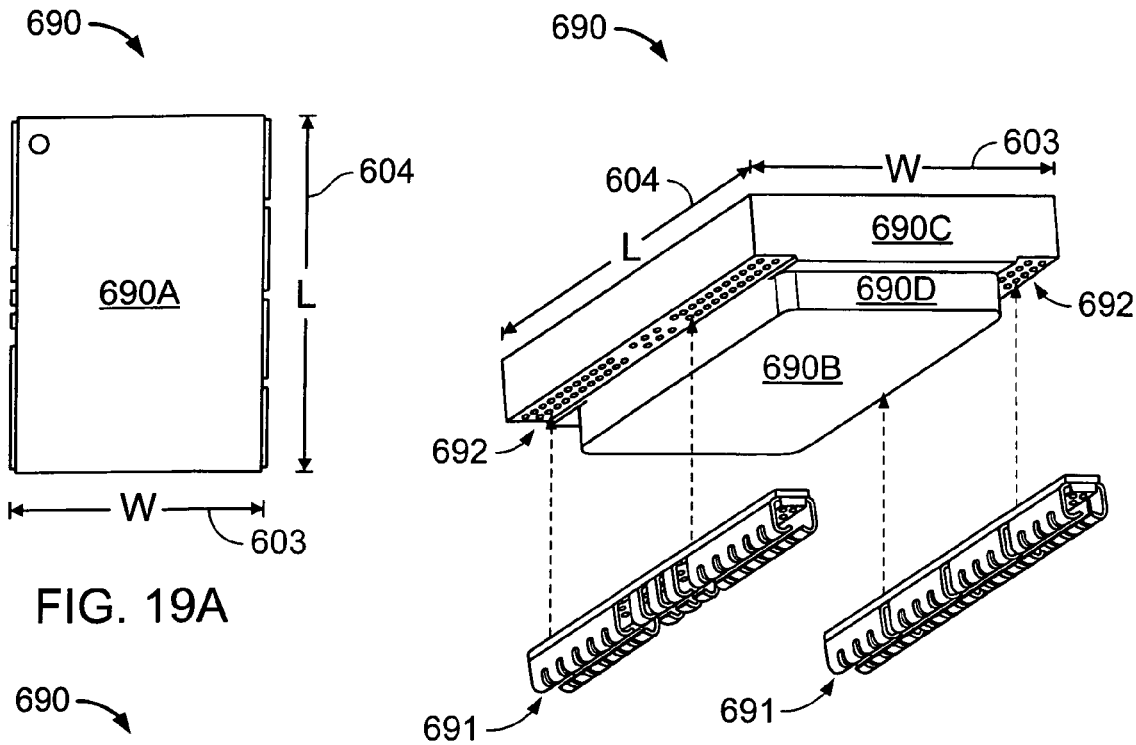
FIG. 19A
FIG. 19B
FIG. 19C
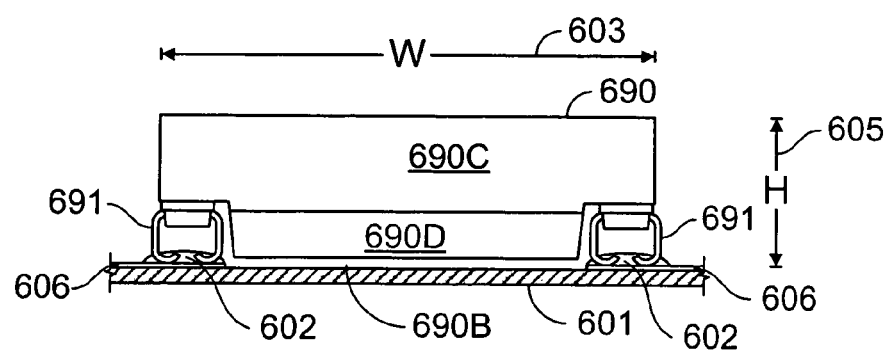
FIG. 19D

ENERGY STORAGE AND HOLD-UP METHOD AND APPARATUS FOR HIGH DENSITY POWER CONVERSION

This application is a continuation-in-part of U.S. application Ser. No. 10/959,779, filed Oct. 6, 2004 (the contents of which are incorporated by reference), now U.S. Pat. No. 7,212,419, which is a continuation-in-part of U.S. application Ser. No. 10/785,465, filed Feb. 24, 2004 (the contents of which are incorporated by reference), now U.S. Pat. No. 7,170,764.

TECHNICAL FIELD

This invention relates to the field of electrical power conversion and more particularly to regulated power conversion systems and off-line auto-ranging power supplies.

BACKGROUND

DC-DC converters transfer power from a DC electrical input source to a load by transferring energy between windings of an isolation transformer. The DC output voltage delivered to the load is controlled by adjusting the timing of internal power switching elements (e.g., by controlling the converter switching frequency and/or the switch duty cycle and/or the phase of switches). As defined herein, the functions of a "DC-DC converter" comprise: a) isolation between the input source and the load; b) conversion of an input voltage to an output voltage; and c) regulation of the output voltage. DC-DC converters may be viewed as a subset of a broad class of switching power converters, referred to as "switching regulators," which convert power from an input source to a load by processing energy through intermediate storage in reactive elements. As defined herein, the functions of a "Switching Regulator" comprise: a) conversion of an input voltage to an output voltage, and b) regulation of the output voltage. If the required output voltage is essentially a positive or negative integer (or rational) multiple of the input voltage, the conversion function may also be efficiently performed by a capacitive "Charge Pump," which transfers energy by adding and subtracting charge from capacitors.

Vinciarelli et al, "Efficient Power Conversion" U.S. Pat. No. 5,786,992 disclose expanding the operating voltage range of isolated DC-DC converters by connecting their inputs and/or outputs in series.

Non-resonant full-bridge, half-bridge, and push-pull DC-to-DC transformer topologies are known. See e.g., Severns and Bloom, "Modern DC-to-DC Switchmode Power Conversion Circuits," ISBN 0-442-21396-4, pp. 78-111. Series, parallel, and other resonant foams of switching power converters are also known. See e.g., Steigerwald, "A Comparison of Half-Bridge Resonant Converter Topologies," IEEE Transactions on Power Electronics, Vol. 2, No. 2, April, 1988. Variable frequency, series resonant, half-bridge converters for operation from an input voltage source are described in Baker, "High Frequency Power Conversion With FET-Controlled Resonant Charge Transfer," PCI Proceedings, April 1983, and in Nerone, U.S. Pat. No. 4,648,017. Half-bridge, single-stage, ZVS, multi-resonant, variable frequency converters, which operate from an input voltage source are shown in Tabisz et al, U.S. Pat. No. 4,841,220 and Tabisz et al, U.S. Pat. No. 4,860,184. A variable frequency, full-bridge, resonant converter, in which an inductor is interposed between the input source and the resonant converter is described in Divan, "Design Considerations for Very High Frequency Resonant Mode DC/DC Converters," IEEE Transactions on Power Electronics, Vol. PE-2, No. 1, January, 1987. A variable frequency, ZVS, half-bridge LLC series resonant converter is described in Bo Yang et al, "LLC Resonant Converter for Front End DC-DC Conversion," CPES Seminar 2001, Blacksburg, Va., April 2001. Analysis and simulation of a "Low Q" half-bridge series resonant converter, wherein the term "Low Q" refers to operation at light load, is described in Bo Yang et al, "Low Q Characteristic of Series Resonant Converter and Its Application," CPES Seminar 2001, Blacksburg, Va., April 2001.

Fixed-frequency half-bridge and full-bridge resonant converters are also known in which output voltage control is achieved by controlling the relative timing of switches. A half-bridge, single-stage, ZVS, multi-resonant, fixed-frequency converter that operates from an input voltage source is shown in Jovanovic et al, U.S. Pat. No. 4,931,716. A full-bridge, single-stage, ZVS, resonant, fixed-frequency converter that operates from an input voltage source is shown in Henze et al, U.S. Pat. No. 4,855,888.

A full-bridge, single-stage, ZCS, series-resonant, fixed-frequency converter, operating at a frequency equal to the characteristic resonant frequency of the converter, is shown in Palz, "Stromversorgung von Satelliten—Wanderfeldrohren hoher Leistung" ("Power Supply for Satellites—High Capacity Traveling-Wave Tubes"), Siemens Zeitschrift, Vol. 48, 1974, pp. 840-846. Half and full-bridge, single-stage, ZVS, resonant, converters, for powering fluorescent tubes are shown in Nalbant, U.S. Pat. No. 5,615,093.

A DC-to-DC Transformer offered for sale by SynQor, Hudson, Mass., USA, called a "BusQor™ Bus Converter," that converts a regulated 48 VDC input to a 12 VDC output at a power level of 240 Watts and that can be paralleled with other similar converters for increased output power delivery, and that is packaged in a quarter brick format, is described in data sheet "Preliminary Tech Spec, Narrow Input, Isolated DC/DC Bus Converter," SynQor Document No. 005-2BQ512J, Rev. 7, August, 2002.

The art of resonant power conversion, including operation below or above resonant frequency, utilizing either ZCS or ZVS control techniques and allowing the resonant cycle to be either completed or purposely interrupted, is summarized in Chapter 19 of Erickson and Maksimovic, "Fundamentals of Power Electronics," 2nd Edition, Kluwer Academic Publishers, 2001.

Cascaded converters, in which a first converter is controlled to generate a voltage or current, which serves as the source of input power for a DC-to-DC transformer stage, are known. A discussion of canonical forms of cascaded converters is given in Sevems and Bloom, ibid, at, e.g., pp. 114-117, 136-139. Baker, ibid, discusses the use of a voltage pre-regulator cascaded with a half-bridge, resonant, variable-frequency converter. Jones, U.S. Pat. No. 4,533,986 shows a continuous-mode PWM boost converter cascaded with both PWM converters and FM resonant half-bridge converters for improving holdup time and improving the power factor presented to an AC input source. A zero-voltage transition, current-fed, full-bridge PWM converter, comprising a PWM boost converter delivering a controlled current to a PWM, full-bridge converter, is shown in Hua et al, "Novel Zero-Voltage Transition PWM Converters," IEEE Transactions on Power Electronics, Vol. 9, No. 2, March, 1994, p. 605. Stuart, U.S. Pat. No. 4,853,832, shows a full-bridge series-resonant converter cascaded with a series-resonant DC-to-DC transformer stage for providing AC bus power to distributed rectified loads. A half-bridge PWM DC-to-DC transformer stage for use in providing input power to point-of-load DC-DC converters in a DPA is described in Mweene et al, "A High- Efficiency 1.5 kW, 390-50V Half-Bridge Converter Operated at 100% Duty Ratio," APEC '92 Conference Proceedings, 1992, pp. 723-730. Schlecht, U.S. Pat. Nos. 5,999,417 and 6,222,742 shows DC-DC converters which incorporate a DC-to-DC transformer stage cascaded with a switching regulator. Vinciarelli, "Buck-Boost DC-DC Switching Power Conversion," U.S. patent application Ser. No. 10/214,859, filed Aug. 8, 2002, assigned to the same assignee as this application and incrporated by reference, discloses a new, high efficiency, ZVS buck-boost converter topology and shows a front-end converter comprising the disclosed topology cascaded with a DC-DC converter and a DC-to-DC transformer.

In one aspect, prior art approaches to off-line power conversion may be characterized by how they accommodate a broad range of nominal line voltages, e.g., 110VAC (i.e. 85-120VAC) and 220 AC (i.e. 170-240VAC). In one approach, the line is simply rectified and power conversion circuitry is designed to operate over the full range of variation of the rectified line voltage; in another approach, called "auto-ranging", the rectification circuitry is reconfigured based upon the nominal value of the line voltage and the range of voltages over which power conversion circuitry must operate is reduced. In another aspect, off-line power conversion may be characterized in terms of whether or not power factor correction ("PFC") is provided. Auto ranging is commonly provided in non-PFC power supplies using a capacitive voltage doubler. Referring to FIG. 10 for example, an off-line power supply includes a bridge rectifier 501, capacitors 502 and 503 connected in series across the rectifier output, and a doubler switch 506 which may be manually or automatically controlled for effecting voltage doubling. For high line voltages e.g. 220VAC the switch remains open and the rectified voltage $V_2$ will approximately equal the peak input voltage $V_{IN}$. For low line applications, the switch 506 is closed and $V_2$ will approximately equal twice the peak input voltage $V_{IN}$ and the voltage $V_2$ will remain nominally at 220V regardless of whether a 110 or 220VAC line is connected at the input. The DC-DC converter 504 provides the voltage transformation, isolation and regulation functions for power delivered to the load 505.

Because it requires the use of energy storage capacitors at the output of the rectifiers, the capacitive voltage-doubler is not generally suitable for use in PFC applications. Vinciarelli et al., "Passive Control of Harmonic Current Drawn From an AC Input by Rectification Circuitry," U.S. Pat. No. 6,608,770, issued Aug. 19, 2003, assigned to the same assignee as this application and incorporated by reference, discloses capacitive voltage-doubling auto-ranging circuitry which passively controls the harmonic current drawn from an AC line.

Another auto-ranging approach suitable for both PFC and non-PFC applications is the use of a line frequency transformer with switched windings. The line voltage may be applied across all or part of the primary winding depending on the applied line voltage. In PFC applications the more common approach is use of a PFC boost converter as shown in FIG. 11. The off-line auto-ranging PFC power supply of FIG. 11 includes bridge rectifier 501, non-isolated PFC Boost converter 507, and storage capacitor 508, followed by isolated DC-DC converter 504. In order to control the current drawn from the AC line for PFC, the output voltage $V_B$ of the boost converter must be set to a voltage greater than the highest peak input voltage $V_{IN}$. In a typical power supply designed for international use, the boost voltage may be 400V. Power is then converted from the boost voltage down to the load voltage by DC-DC converter 504, which provides voltage transformation, regulation, and isolation. Operation of the boost and DC-DC converters at such high voltages includes cost and performance penalties including, lower figure of merit for switches at high voltages and safety issues for energy storage at high voltages.

One solution, disclosed in Vinciarelli et al., "Efficient Power Conversion," U.S. Pat. No. 5,786,992, issued Jul. 28, 1998, assigned to the same assignee as this application and incorporated by reference, configures power converters in series and parallel allowing the combination of converters to operate over a greater voltage range.

SUMMARY

In general, one aspect features a method of converting power a method of converting power from a source at a source voltage for delivery to a load at a load voltage where the source voltage may vary between a high line voltage and a low line voltage in a normal operating range. The method provides DC-DC voltage transformation and isolation in a first power conversion stage. The first stage has a CA input for receiving power from the source and a CA output. Power regulation is provided in a second power conversion stage. The second stage includes a PR input for receiving power from the CA output of the first stage, regulation circuitry, and a PR output for delivering power to the load. The regulation circuitry is adapted to maintain the load voltage within a regulation range while the PR input voltage remains within a normal operating range. A hold-up circuit is provided with a charge path and a discharge path for connection to a hold-up capacitance. The discharge path provides a low impedance connection between the hold-up capacitance and the PR input for supplying power to the power regulator. The charge path provides a charge current to charge the hold-up capacitance. The hold-up circuit is configured to charge the hold-up capacitance when a first predetermined condition is satisfied and to provide power to the PR input when a second predetermined condition is satisfied.

Implementations of the method may include one or more of the following features.

The DC-DC voltage transformation and isolation may include an integrated adaptive converter array having a first input cell and a second input cell, each input cell having a respective number, $P_x$, of turns, an output cell having a respective number, $S_x$, of turns and magnetic coupling between the turns to form a transformer common to the first and second input cells and the output cell. The input cells may be configured in a parallel connection for operation at the low line voltage and in a series connection for operation at the high line voltage.

The DC-DC voltage transformation and isolation may include an array of two or more VTMs, each VTM having an input, an output, and a substantially fixed voltage transformation ratio, $K=V_{out}/V_{in}$, over the normal operating range, where $V_{in}$ is the voltage across the respective VTM input and $V_{out}$ is the voltage across the respective VTM output, and providing isolation between its input and its output. The inputs of the VTMs may be configured in a parallel connection for operation at the low line voltage and in a series connection for operation at the high line voltage.

Circuitry may be provided for performing the method in a self-contained assembly for installation as a unit having terminals for connecting to the CA input, the PR output, and the hold-up circuit. The hold-up capacitor may be provided as a component external to the assembly. Control circuitry adapted to detect the first and second predetermined conditions and to configure the hold-up circuit may be provided. The control circuitry may be adapted to detect an error signal from the regulation circuitry and the second predetermined condition may comprise the error signal being outside a predetermined range. The second predetermined condition may comprise the source voltage being below a first predetermined level and the hold-up capacitor being charged above a second predetermined level. A DC input directly coupled to the second power conversion stage may be provided for receiving power from an external DC source. The DC input may be connected to the PR input via the discharge path. The DC input may be connected to the PR input via switch circuitry capable of blocking current flow in both directions when OFF and conducting current in both directions when ON. The switch circuitry may be turned ON to connect the external DC source to the PR input. The hold-up circuit may include switch circuitry capable of blocking current flow in both directions when OFF and conducting current in both directions when ON. The switch circuitry may be controlled to provide the charge path and the discharge path. A switch may be provided in the discharge path for connecting the hold-up capacitance to the PR input when the switch is ON. The hold-up circuit may include a current limiting element in the charge path. Power factor correction may be provided in the power regulator and a smoothing capacitance may be provided at the PR output. A boost circuit may be provided with an output connected to charge the hold-up capacitance. The boost circuit may have an input connected to the PR output. Circuitry to switch a single capacitance between a first configuration and a second configuration may be provided so the capacitance may be connected to the PR output as the smoothing capacitance in the first configuration and to the hold-up circuit as the hold-up capacitance in the second configuration.

In general, one aspect features a method of converting power from an AC source for delivery to a system including a load. The method provides a power converter module ("PCM") having input terminals for receiving power from the source, output terminals for delivering power to a load at a regulated DC voltage, and power conversion circuitry. The PCM is a self-contained assembly adapted to be installed as a unit. The power conversion circuitry comprises DC-DC voltage transformation ("VT") circuitry and power regulation ("PR") circuitry. The VT circuitry has an input connected to the input terminals, an output for delivering power to the PR circuitry, and provides voltage transformation and isolation. The PR circuitry has an output connected to the output terminals and provides output regulation. A capacitive energy storage component external to the PCM is provided for the isolated side of the power conversion circuitry.

Implementations of the method may include one or more of the following features.

The VT circuitry may include an integrated adaptive converter array having a first input cell and a second input cell, each input cell having a respective number, $P_x$, of turns, an output cell having a respective number, $S_x$, of turns, and magnetic coupling between the turns to form a transformer common to the first and second input cells and the output cell. Control circuitry may be provided for configuring the input cells in a parallel connection for operation at a low line voltage and in a series connection for operation at a high line voltage. The VT circuitry may include an array of two or more VTMs, each VTM having an input, an output, and a substantially fixed voltage transformation ratio, $K=V_{out}/V_{in}$, over the normal operating range, where $V_{in}$ is the voltage across the respective VTM input and $V_{out}$ is the voltage across the respective VTM output, and providing isolation between its input and its output. Control circuitry may be provided for configuring the VTMs in a parallel connection for operation at a low line voltage and in a series connection for operation at a high line voltage. The PR circuitry may include a buck-boost converter with PFC circuitry. The power conversion circuitry may include a hold-up switch connected between a hold-up terminal and the PR input and a smoothing switch connected between the hold-up terminal and the PR output. The PR circuitry may include power factor correction circuitry and the PCM may require a single external capacitive energy storage component connected to the hold-up terminal. The power conversion circuitry may include a hold-up switch connected between a hold-up terminal and the PR input and the capacitive energy storage component may be connected to the hold-up terminal to provide power to the PR input. The PR circuitry may include power factor correction circuitry and the external capacitive energy storage component may be connected to PR output as a smoothing capacitor.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 19A shows a top view of a power converter module.
FIG. 19B shows a side view of a power converter module.

FIG. 19C shows an exploded perspective view of a power converter module.

FIG. 19D shows a side assembly view of a power converter module.

Like reference symbols in the various drawings indicate like elements.

DETAILED DESCRIPTION

Figure 1:
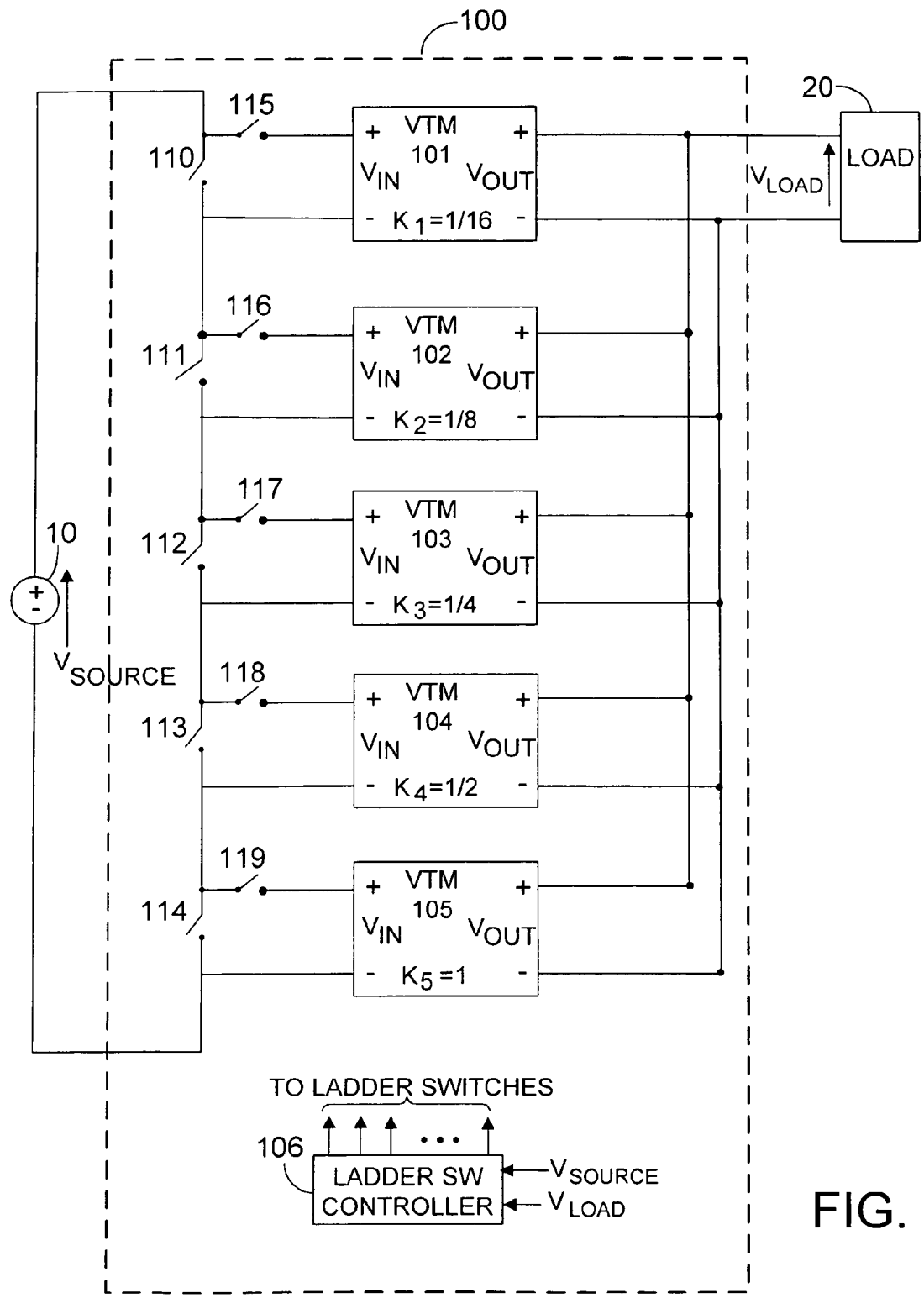
FIG. 1 shows an input-switched adaptive array of VTMs.

A Voltage Transformation Module ("VTM") as defined herein delivers a DC output voltage, $V_{out}$, which is a fixed fraction of the voltage, $V_{in}$, delivered to its input and provides isolation between its input and its output. The voltage transformation ratio or voltage gain of the VTM (defined herein as the ratio, $K=V_{out}/V_{in}$, of its output voltage to its input voltage at a load current) is fixed by design, e.g. by the VTM converter topology, its timing architecture, and the turns ratio of the transformer included within it. Vinciarelli, "Factorized Power Architecture With Point Of Load Sine Amplitude Converters," U.S. patent application Ser. No. 10/264,327, filed Oct. 1, 2002, (referred to herein as the "Factorized Application") assigned to the same assignee as this application and incorporated by reference, discloses preferred converter topologies and timing architectures for VTMs, which will be generally referred to as a Sine Amplitude Converter ("SAC") topology.

The SAC topology has many advantages over prior art DC-to-DC transformer topologies. The SAC topology may incorporate a "low Q" resonant tank (where the term "low Q" has the meaning given in the Factorized Application with respect to transformers for use in a SAC) and is nominally operated at resonance so that the reactive impedances of the elements of the resonant tank cancel each other out. The SAC uses a resonant topology at resonance so that the impedance of the resonant circuit becomes essentially resistive, minimizing the output impedance and open-loop resistance of the converter, and thus minimizing open-loop voltage droop as a function of changing load. Greater consistency in open-loop DC output resistance, owing to the elimination of dependency on reactive impedances, gives rise to fault tolerant power sharing attributes which are particularly desirable in applications in which multiple, paralleled, VTMs are operated as a power sharing array.

Operating waveforms in SAC converters closely approximate pure sinusoidal waveforms, thus optimizing spectral purity, and hence the converter's conducted and radiated noise characteristics. In operation, a SAC maintains an essentially constant conversion ratio and operating frequency as the amplitudes of its essentially sinusoidal voltage and current waveforms vary in response to a varying output load. The timing architecture of the SAC topology supports ZVS operation of the primary switches and ZCS and ZVS operation of the secondary switches, virtually eliminating switching losses in the primary switching elements and secondary switching elements, or rectifiers, particularly synchronous rectifiers, enabling higher switching frequencies and higher converter power density and efficiency. Sine Amplitude Converters provide the best combination of attributes to support the requirements of VTMs and high performance DC-DC converters.

VTMs and in particular SACs are capable of achieving very high power densities. The present application discloses methods and apparatus for adaptively configuring an array of VTMs, as the input voltage to the array of VTMs varies over a pre-defined range, in order to regulate the output voltage of the array.

A "digital" ladder array of VTMs 100 adaptively configurable to provide a regulated output voltage from an input source 10 is shown in FIG. 1. The adaptive VTM array 100 adjusts to changes in input voltage or changing output voltage requirements by selectively configuring the VTMs. The VTM outputs are connected in parallel to supply power to the load 20. Each VTM has a transformation ratio, K, selected to provide the necessary resolution. In the example of FIG. 1, VTMs 101, 102, 103, 104, and 105 have transformation ratios of 1/16, 1/8, 1/4, 1/2, and 1/1, respectively for a digital ladder (thus the reference to the array as a "digital" array). The VTM inputs are connected to receive power from the input source through controlled switches 110-119 which may be low resistance (FET) switches. The array 100 of FIG. 1 may be configured for an aggregate transformation ration of 1/1 to 1/31 in steps of 1 in the denominator by switching the VTM inputs in and out of the input circuit. A VTM is disconnected in FIG. 1 by closing its respective shunt switch (110-114) and opening its respective series switch (115-119). The VTMs that are disconnected may be disabled (i.e., rendered non-operating) until switched back into the circuit or may remain enabled. A ladder switch controller 106 senses the input voltage and configures the ladder switches to provide the necessary aggregate voltage transformation ratio to regulate the load voltage. The controller 106 may also sense the load or array output voltage as shown in FIG. 1.

The input voltage will divide across the series connected inputs of VTMs having their outputs connected in parallel in proportion to their respective individual transformation ratios. The voltage across the input of $VTM_n$ (in a series-connected-input and parallel-connected-output array) may be expressed as follows:

$$V_{i_n} = \frac{V_{Source}}{K_n} \times K_{aggr}$$

where $K_{aggr}$, the aggregate transformation ratio for the series-connected-input and parallel-connected-output array of VTMs, is the reciprocal of the sum of the individual transformation ratios of those VTMs that are connected in the array:

$$K_{aggr} = 1 \Big/ \sum_{connected} \frac{1}{K_i}$$

Referring to the example of FIG. 1, assume that the array 100 is to deliver a nominal 2.3V to the load 20 from an input source 10 that may vary from 36V to 72V. At low line conditions with Vin=36V, the controller configures the switches (110, 116-119 open and 115, 111-114 closed) so that only the input of VTM 101 is connected across the input source and the other VTMs 102-105 are disconnected from the source. Since the only connected VTM is the one having $K_1$=1/16, the aggregate transformation ratio will be $K_{aggr}$=1/16 and the array will deliver $V_{out}$=$V_{Source}$ $K_{aggr}$=36/16=2.25V to the load. As the source voltage increases, the controller adaptively reconfigures the array to provide the necessary load regulation. For example, for a source voltage of 38V, the controller may reconfigure the array by connecting the inputs of VTMs 101 and 105 in series and disconnecting VTMs 102-104 (switches 110, 114, 116-118 open, 111-113, 115, 119 closed) to provide an aggregate transformation ratio $K_{aggr}$=1/(16+1)=1/17 and an output voltage $V_{out}$=$V_{Source}$ $K_{aggr}$=38/17=2.24V. At maximum input voltage, with Vin=72V, controller 106 configures the switches (110-114 open, 115-119 closed) to connect all of the VTMs in series. The aggregate transformation ratio will be $K_{aggr}$=1/(16+8+4+2+1)=1/31 and the array will deliver 72/31=2.32V to the load.

It will be appreciated that the adaptive digital ladder VTM array of FIG. 1 efficiently provides all of the classic functions of a DC-DC converter (including isolation, voltage step-up or step down, AND regulation) by adaptively configuring a series combination of VTM inputs to adjust the aggregate K factor, $K_{aggr}$. The number of VTMs in the array may be increased to provide greater resolution and thus better regulation. For example, an additional VTM (e.g., one having a transformation ratio K=2/1 or one having a transformation ratio K=1/32) may be added to further increase the resolution or the input range of the array. However, the minimum input or output operating voltage of the VTMs may impose a practical limitation on the resolution in the K, 2K, 4K digital ladder array of FIG. 1 because of practical limitations in achievable values of K in a VTM.

Figure 5A:
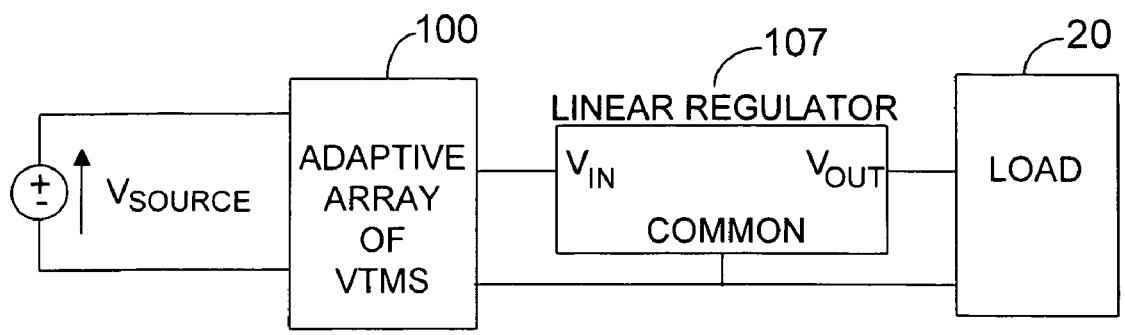
FIGS. 5A and 5B show use of a linear regulator with an adaptive array of VTMs.
Figure 5B:
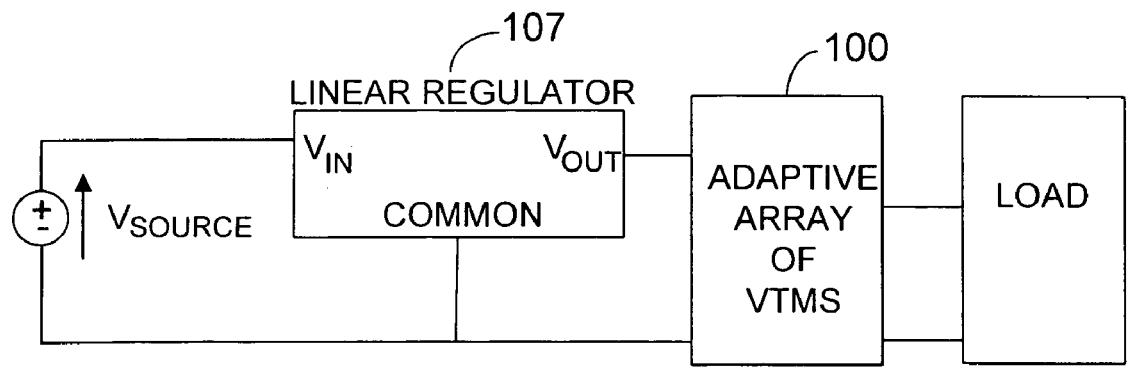

If the output voltage regulation requirement exceeds the resolution of an adaptive VTM array, finer regulation may be provided by an analog dissipative linear regulator in series with the input or output of a VTM array. FIGS. 5A and 5B, show a linear regulator 107 in series with the output and input, respectively, of adaptive array 100. If, for example, an adaptive VTM array can achieve a regulation resolution of 1 percent with a manageable number of bits, the dissipation associated with using an appropriately designed analog series linear regulator, e.g. 107, to absorb substantially all of the 1% VTM array error may be negligible in terms of the overall converter efficiency. In fact such a loss may be smaller than the loss associated with a series-connected switching regulator (e.g., a "PRM", as described in the Factorized Application, and that may, in some applications, use the topology described in Vinciarelli, "Buck-Boost DC-DC Switching Power Conversion," U.S. Pat. No. 6,788,033 issued Sep. 7, 2004 (referred to herein as the "Buck-Boost Patent"), both assigned to the same assignee as this application and incorporated by reference). Use of a series linear regulator also eliminates the response delays and switching noise that would be introduced by use of a series-connected switching regulator. The analog series linear regulator also may provide enough bandwidth to effectively filter "hash" or "digital jitter" that may be generated due to instances of reconfiguration of the array.

It may be preferable to provide the configuration switches on the higher voltage side of the array to reduce power dissipation in the switches. In the example of FIG. 1, the source voltage was stepped down by the array; therefore, the switches were placed on the input side of the array. In voltage step-up applications, the switches may be placed on the secondary side to produce a series connected secondary adaptive array.

Figure 2:
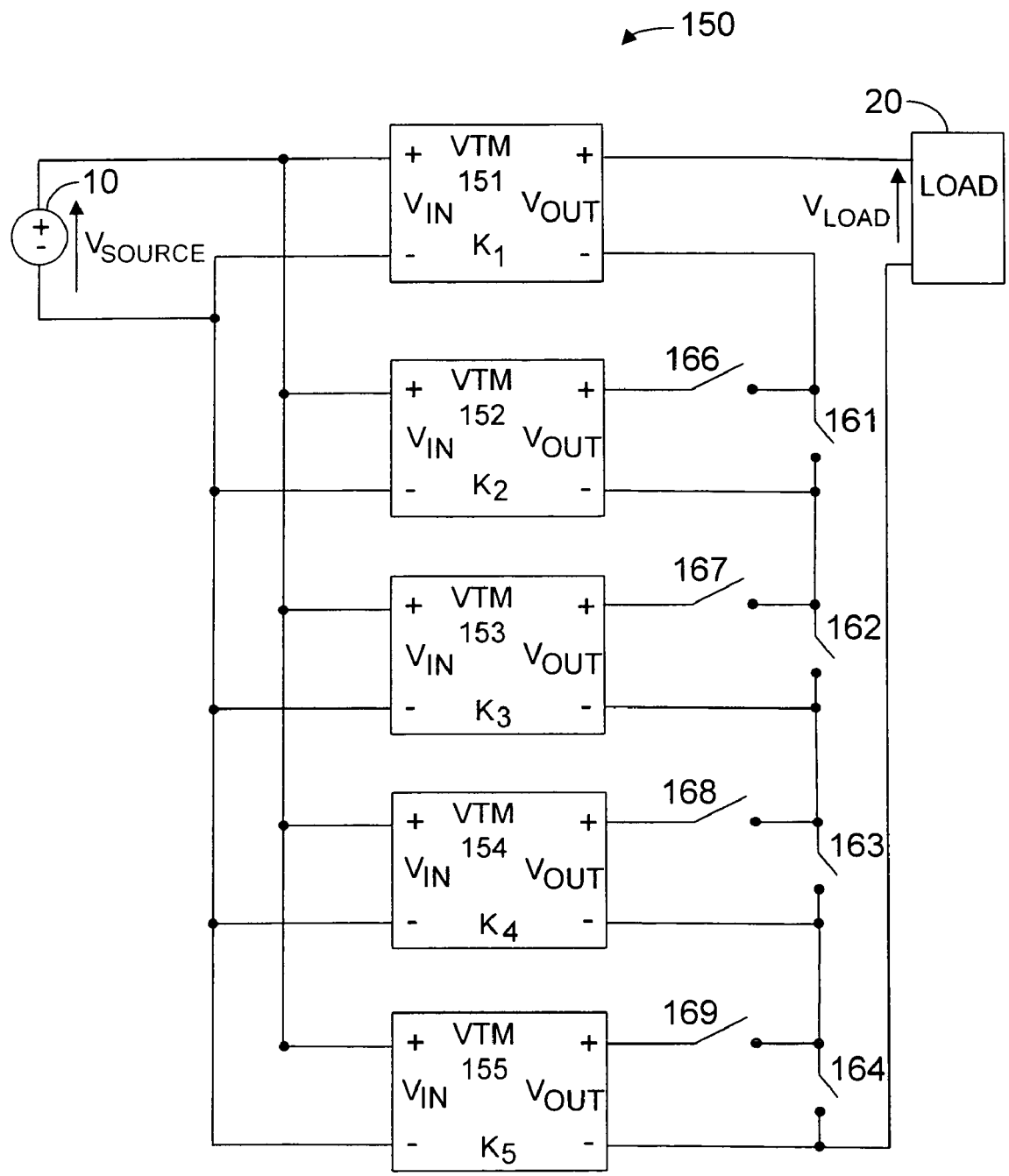
FIG. 2 shows an output-switched adaptive array of VTMs.
Figure 2:
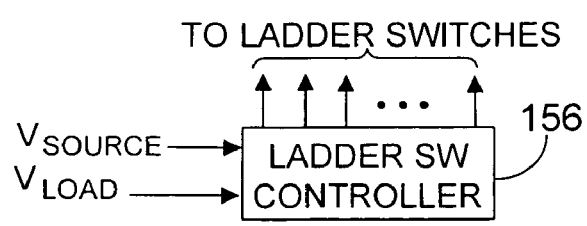

Referring to FIG. 2, an example of a step-up adaptive array 150 with configuration switches 161-164, 166-169 on the output side of the array is shown. The array 150 is designed to provide 48+/−1 Volt output from an input voltage range of 10-15V. For this application, the array must provide a minimum transformation ratio less than or equal to $K_{min}$:

$$K_{min} = \frac{V_{out_{max}}}{V_{in_{max}}} = \frac{48+1}{15} = 3.26$$

The array must also provide a transformation ratio greater than or equal to $K_{max}$:

$$K_{max} = \frac{V_{out_{min}}}{V_{in_{min}}} = \frac{48-1}{10} = 4.7$$

In order to satisfy the regulation requirement, the array must have a step size in the transformation ratio less than or equal to $\Delta K_{max}$:

$$\Delta K_{max} = \frac{\Delta V_{out}}{V_{in_{max}}} = \frac{49-47}{15} = .13$$

Finally, the array must provide a number of steps in the transformation ratio greater than or equal to $N_{steps}$:

$$N_{steps} = \frac{K_{max} - K_{min}}{\Delta K_{max}} = \frac{4.7-3.26}{.13} = 11.1$$

From the above calculations, a five VTM array will satisfy the design criteria. A four-bit K, 2K digital ladder having 15 steps will satisfy the $N_{steps}$ requirement. A step size of $\Delta K$=1/8=0.125 is less than and therefore satisfies the resolution requirement $\Delta K_{max}$ and provides an adjustment range $N_{steps} \times \Delta K$=15×1/8=1.875 that is greater than required. VTMs 152, 153, 154, and 155 will have the following respective transformation ratios $K_5$=1/8, $K_4$=1/4, $K_3$=1/2, and $K_2$=1. The transformation ratio of the main VTM 151 thus may be set to $K_1$=3 which will easily satisfy the minimum requirement, $K_{min}$ and provide an aggregate transformation ratio for the array ranging from 3.0 to 4.875.

The inputs of the VTMs 151-155 are connected in parallel and the outputs are adaptively connected in series as needed to regulate the output voltage. Because the main VTM 151 is configured to deliver power continuously it does not have a series or shunt switch on its output (the array of FIG. 1 may also be adapted in this way). Auxiliary VTMs 152-155 are configured to form the four-bit K, 2K ladder whose switches are controlled by the ladder switch controller 156. The controller may sense the source and load voltages to better regulate the load voltage. It will be appreciated that array 150 provides 48V+/−2% over an input voltage range from 9.6V to 16.3V.

Figure 7:
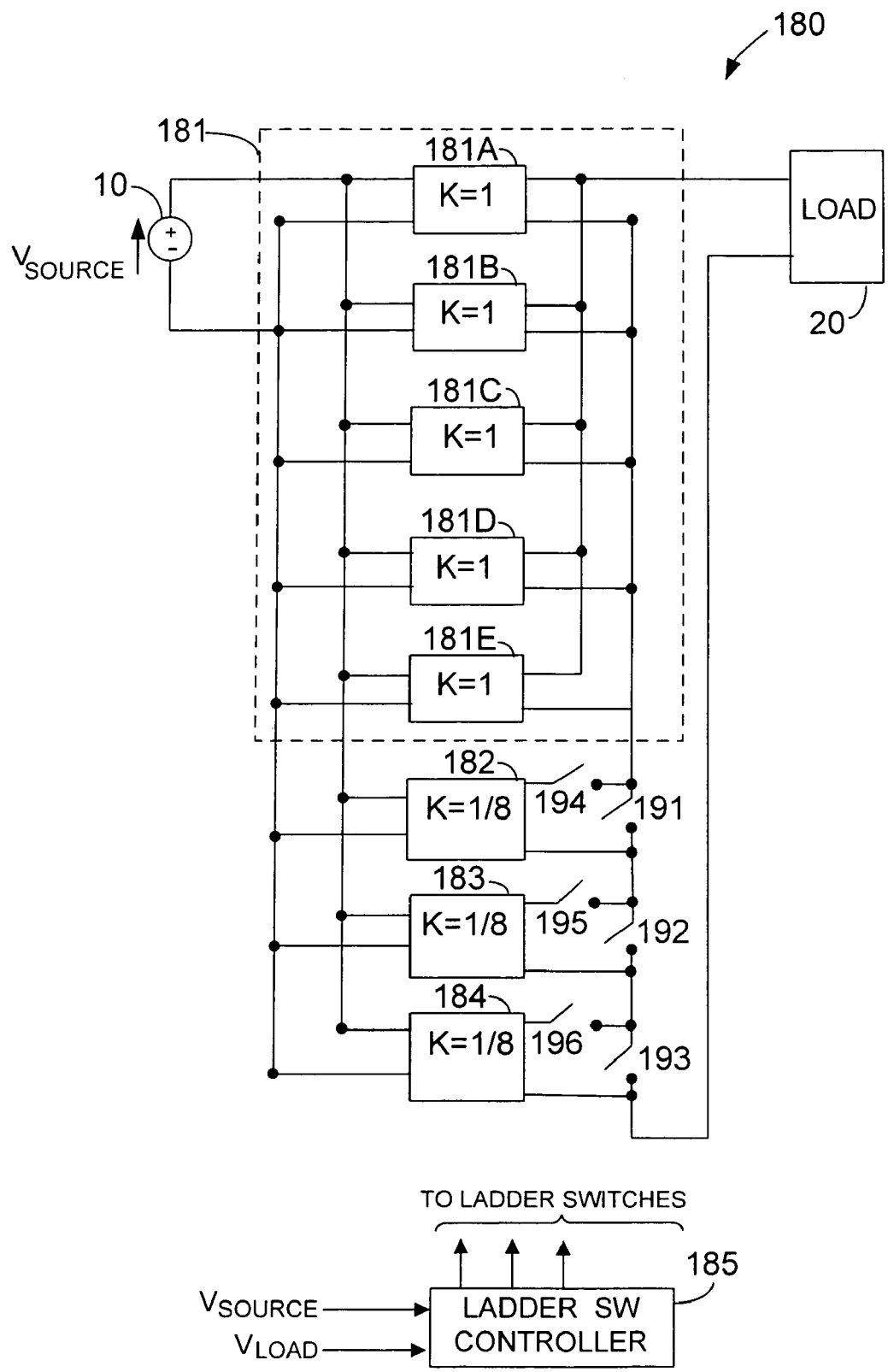
FIG. 7 shows a schematic of an output switched adaptive array of VTMs.

An example of an adaptive array comprising a power sharing sub-array of VTMs is shown in FIG. 7. The adaptive array 180 is designed to deliver 50 VDC+/−5V from an input source that varies from 38 to 55VDC. A power sharing sub-array 181, comprising VTMs 181A-181E, each having a transformation ratio K=1, supplies most of the power to the load. As the input voltage drops, the outputs of auxiliary VTMs 182-184, each of which has a transformation ratio of K=1/8, are switched in series with the output of the main array 181 by ladder switch controller 185. The aggregate transformation ratio of the adaptive array 180 varies from $K_{aggr}$=1 to 1.375 providing the necessary regulation. The auxiliary VTMs supply only a small fraction of the total power and therefore do not need to be connected in power sharing arrays for this application.

Figure 3:
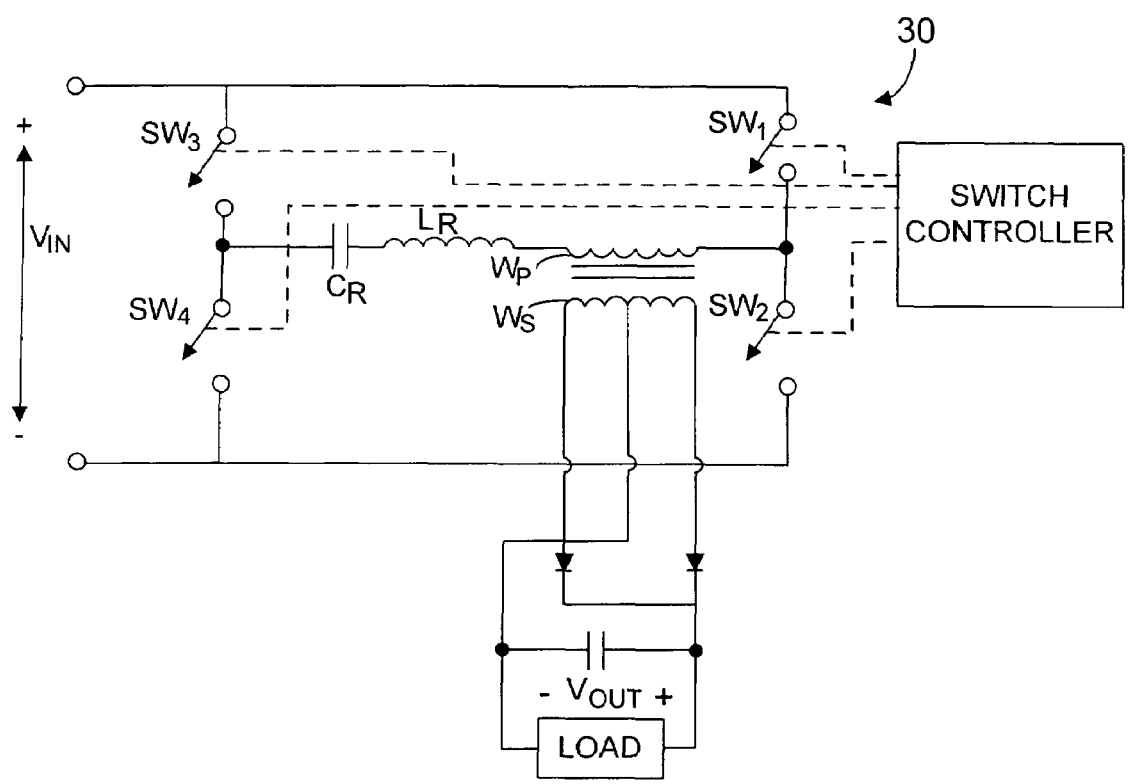
FIG. 3 shows a schematic diagram of a full-bridge SAC.

As described in conjunction with FIGS. 1-2 and 7, the adaptive VTM array concept may be realized with a multiplicity of separate VTMs having independent isolation transformers and appropriate K factors, with each such VTM separately controlled to operate at a respective switching frequency. However, the Sine Amplitude Converter ("SAC") is particularly well suited for use in an integrated version of an adaptive VTM array. A full-bridge SAC of the type described in the Factorized Application is shown in FIG. 3. The SAC includes one primary circuit and one secondary circuit. The primary circuit comprises transformer primary winding $W_P$, in series with resonant capacitance CR, and resonant inductance $L_R$ (which may have a low Q (where the term "low Q" has the meaning given in the Factorized Application with respect to transformers for use in a SAC) and may partially or entirely consist of the primary reflected leakage inductance of the transformer) driven by primary switches SW1, SW2, SW3, SW4. The switches SW1, SW2, SW3, SW4, are controlled by the switch controller to operate at near resonance with short energy recycling intervals to provide zero voltage switching. The output circuit, which includes the transformer secondary winding $W_P$, coupled to a rectifier circuit and a filter capacitor, supplies power to the load.

Figure 4:
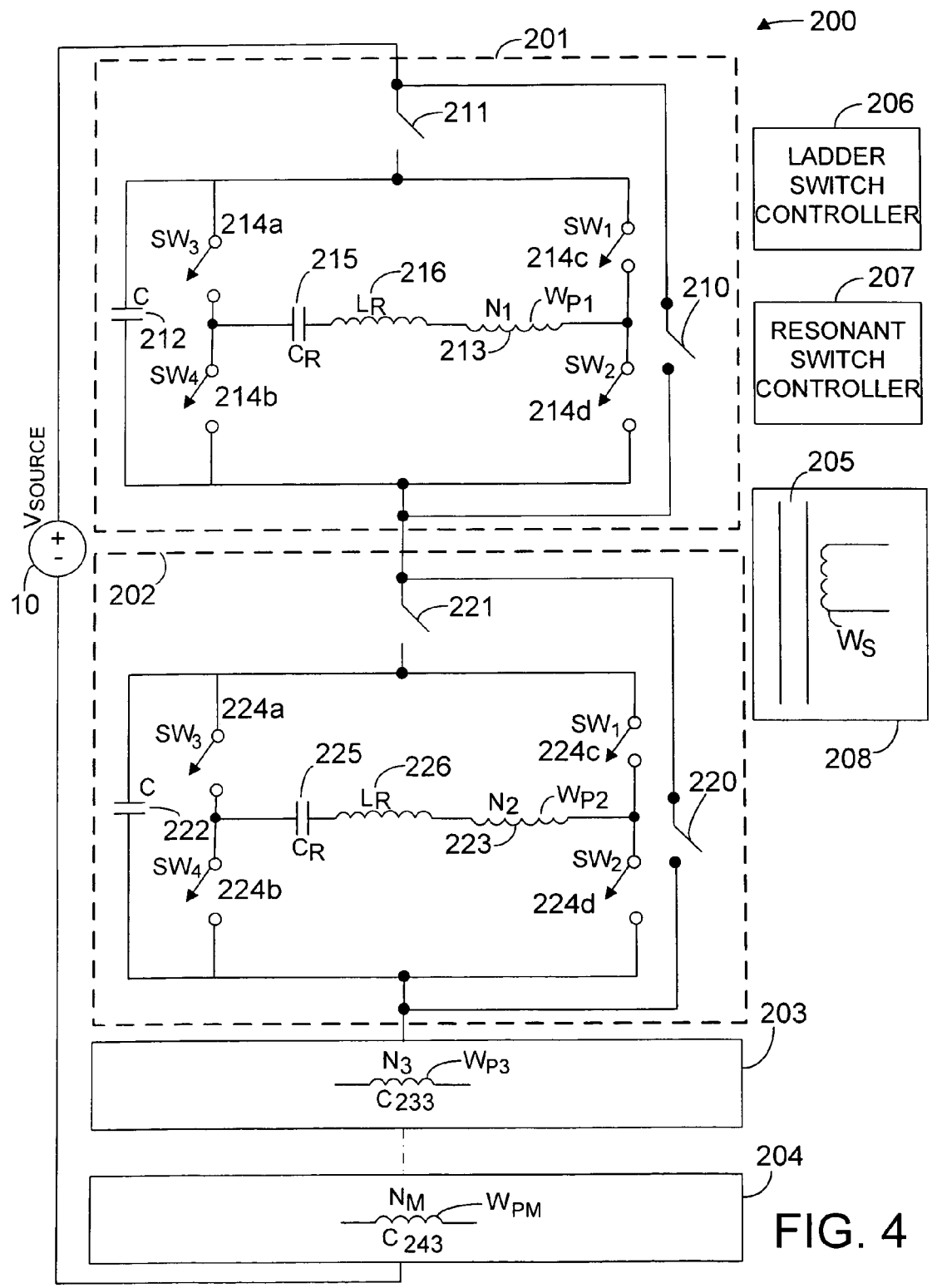
FIG. 4 shows a schematic diagram of a modified SAC with an adaptive array of input cells integrated with a common output circuit.

Referring to FIG. 4, an integrated adaptive array 200 using the SAC topology is shown having a plurality of full-bridge SAC input cells 201, 202, 203, 204 coupled to a common SAC output cell 208. The input cells may be the same as the primary circuit of FIG. 3 with the addition of a bypass capacitor, e.g. capacitors 212 and 222, a series switch, e.g. series switches 211, 221, and a shunt switch, e.g. shunt switch 210, 220 for each cell. Also the primary windings $W_{P1}$, $W_{P2}$, $W_{P3}$, ... $W_{Pm}$ may be part of one transformer 205 having a single secondary winding $W_S$ coupled to the output circuit 208. The number of turns $N_1$, $N_2$, $N_3$, ... $N_m$ in the primary windings may be selected to provide the appropriate transformation ratio for each cell. Using the K, 2K digital ladder example of FIG. 1, the integrated adaptive array SAC 200 could have five input cells having respectively 16 turns, 8 turns, 4 turns, 2 turns and 1 turn. A resonant switch controller 207 common to all of the cells may operate the primary switches SW1-SW4 of all of the cells (and the synchronous rectifiers in the output cells if used) in synchronism.

The input cells are switched in and out of the series combination as required to adjust the aggregate transformation ratio and thus regulate the output voltage as discussed above in connection with FIG. 1. When an input cell is in the circuit, its series switch e.g. 211, 221 is closed and its shunt switch e.g. 210, 220 is open. Conversely, when an input cell is switched out of the circuit its series switch e.g. 211, 221 is open and its shunt switch e.g. 210, 220 is closed. The ladder switch controller 205 controls the series and shunt switches of all of the cells. An input cell that is switched out of the circuit may remain active (i.e., its primary switches continue to operate) which will keep its respective bypass capacitor, e.g. capacitor 212, 222, charged to the appropriate voltage (due to the bi-directional nature of the SAC topology) thereby eliminating in-rush current problems during reconfiguration of the digital ladder. The ladder switch controller 206 may sense the input voltage and optionally may also sense the load voltage to configure the input cells. When connected in series, each input cell shares in a fraction of the input voltage equal to the number of its primary winding turns divided by the total number of turns for all of the input cells that are connected in the array (i.e., where the term "connected" refers to cells whose shunt switches are open and whose series switches are closed).

Figure 6:
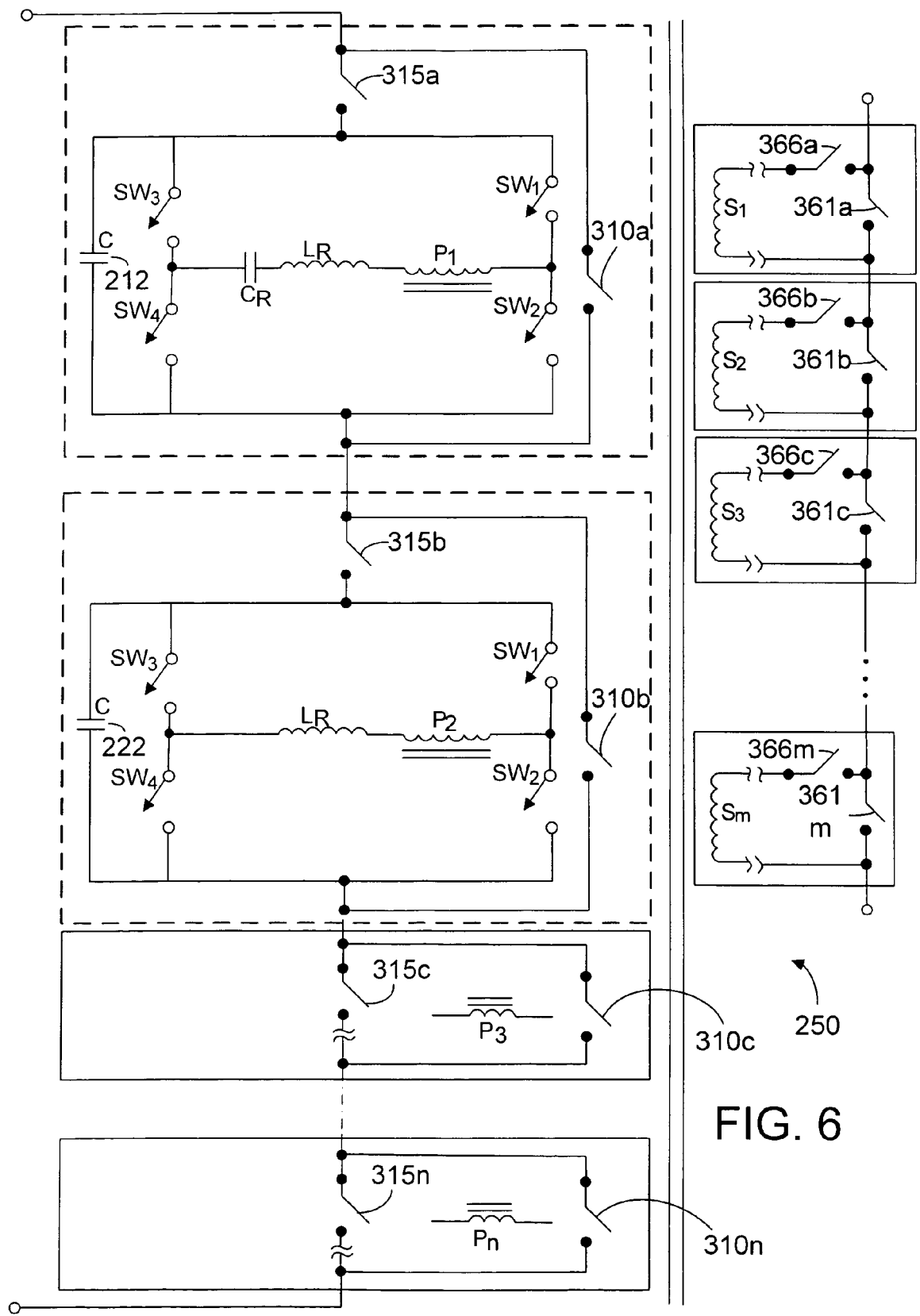
FIG. 6 shows a schematic diagram of an array of VTM cells with the inputs and outputs adaptively configured in series to provide output regulation.

A more elaborate integrated adaptive array 250 may incorporate a plurality of input cells and a plurality of output cells as shown in FIG. 6. In FIG. 6, a series of VTM input cells are adaptively stacked on the input (by means of primary series switches 315a-315n and primary shunt switches 310a-310n analogous to, respectively, switches 115-119 and 110-114 in FIG. 1) and a series of VTM output cells are adaptively stacked on the output (by means of secondary series switches 366a-366m and secondary shunt switches 361a-361m analogous to, respectively, switches 166-169 and 161-164 in FIG. 2) to adaptively adjust the effective VTM K factor. Because a common transformer comprising primary windings $P_1$-$P_n$ and secondary windings $S_1$-$S_m$, is used for all of the cells, any combination of input and output cells may be combined to provide the requisite transformation ratio. In general, the integrated adaptive array of FIG. 6, provides an aggregate K expressed as:

$$K_{aggr} = (S_1 + S_2 + \ldots + S_m)/(P_1 + P_2 + \ldots + P_n)$$

corresponding to a truncated series combination of connected output cells having $S_x$ transformer turns and a truncated series combination of connected input cells having $P_x$ transformer turns where the term "connected" has the definition given above). As discussed above, the integrated adaptive array adjusts to changes in input voltage or changing output voltage requirements by adaptively configuring the input and/or output cells in series. It will be appreciated that the generalized adaptive array of FIG. 6 may be modified to use a single input cell with a plurality of output cells (analogous to the VTM array of FIG. 2) or alternatively a single output cell with a plurality of inputs cells (as discussed above in connection with FIG. 4). Furthermore, some cells in such an array may be permanently connected and not include series and shunt switches.

An integrated adaptive array based upon the SAC converter topology, such as the arrays shown in FIGS. 4 and 6, may preserve all of the key SAC features, including, in particular: a) the benefits of low Q resonant transformers for efficient high frequency power processing (where the term "low Q" has the meaning given in the Factorized Application with respect to transformers for use in a SAC); b) extremely high power density (exceeding or of the order of 1 KW/in$^3$); c) absence of serial energy storage through an inductor (as required by classic switching regulators) leading to fast (<<1 microsecond) transient response; d) fast bi-directional power processing leading to effective bypass capacitance multiplication; and e) low noise performance owing to the ZCS/ZVS characteristics of SACs.

Additional advantages, such as reduced size and cost may be realized by integrating the array within a single package using, e.g., the packaging and transformer design and layout techniques described in the Factorized Application; in Vinciarelli et al, "Power Converter Package and Thermal Management," U.S. patent application Ser. No. 10/303,613, filed Nov. 25, 2002; and in Vinciarelli, "Printed Circuit Transformer," U.S. patent application Ser. No. 10/723,768, filed Nov. 26, 2003, all assigned to the same assignee as this application and incorporated by reference.

Figure 8:
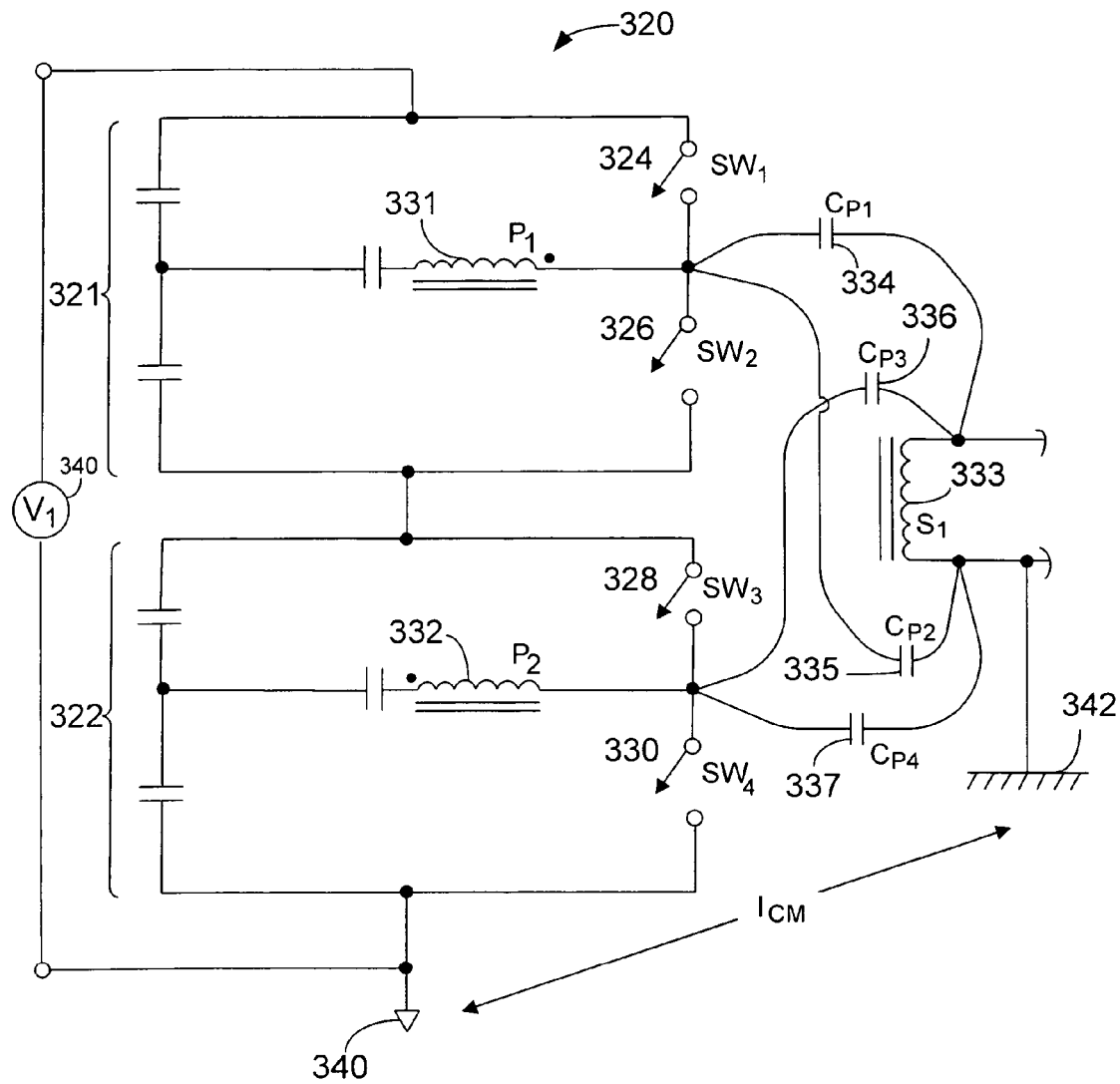
FIG. 8 shows a converter topology using a complementary pair of input cells.

FIG. 8 shows an array 320 comprising two half-bridge input cells 321, 322 connected in series to receive power from an input source 340 having a voltage, $V_1$. Primary windings 331, 332 (having $P_1$ and $P_2$ turns respectively) and secondary winding 333 (having $P_2$ turns) form part of a common transformer. Each input cell includes a positive referenced switch 324, 328 and a negative-referenced switch 326, 330 providing doubled-ended drive for primary windings 331, 332. The input cells 321, 322 are arranged in a pair with the polarity of the primary windings reversed. The pair of input cells 321, 322 produces opposing flux when driven by their respective positive-referenced switch 324, 328. In operation, the switches in the pair of input cells are operated 180 degrees out of phase in synchronism so that switches SW1 324 and SW4 330 are closed at essentially the same time (when switches SW2 326 and SW3 328 are open) and switches SW2 326 and SW3 328 are closed at essentially the same time (when switches SW1 324 and SW4 330 are open).

One benefit of the complementary pair of input cells is that common-mode currents that would otherwise be capacitively coupled between primary windings, 331, 332, and secondary winding, 333, as illustrated by the flow of current $I_{CM}$ between primary 340 and secondary 342 grounds in FIG. 8, will be reduced. In illustration, FIG. 8 incorporates several representative parasitic capacitances, $C_{P1}$ through $C_{P4}$ 334-337. When switches SW2 and SW3 are opened, the rate-of-change of voltage across parasitic capacitors $C_{P1}$ 334 and $C_{P2}$ 335 will be positive and the rate-of-change of voltage across parasitic capacitors $C_{P3}$ 336 and $C_{P4}$ 337 will be negative and the net flow of current in the capacitors will tend to cancel. Likewise, the currents in the parasitic capacitors will also tend to cancel when switches SW1 and SW4 are opened. The net common-mode current, $I_{CM}$, flowing between the primary and secondary side of the array can be reduced using this arrangement.

Another advantage of the topology of FIG. 8 is that, for a given input source 340 voltage, $V_1$, the use of a pair of input cells allows use of primary switches (e.g., switches SW1-SW4, FIG. 8) having a breakdown voltage rating that is one-half of the rating that would be required if a single input cell were used. In one aspect, lower voltage primary switches (e.g. MOSFETs) may generally have lower levels of energy stored in the parasitic switch capacitances allowing the peak value of magnetizing energy to be set to a lower value while still enabling zero-voltage switching. For a given conversion efficiency, a reduction in magnetizing energy and current may enable operation at a higher frequency leading to higher power density and a smaller size for the converter. On the other hand, for a given operating frequency, a reduction in magnetizing current may provide for higher conversion efficiency. In another aspect, the use of a pair of input cells in place of a single input cell may allow use of lower cost, higher performance switches. For example, in "off-line" applications the input source voltage, $V_1$, may be 370 VDC. In such applications use of a pair of input cells enables use of primary switches having a 200 V breakdown rating, in contrast to the 400 V primary switch rating that would be required in an application using a single input cell.

Figure 9:
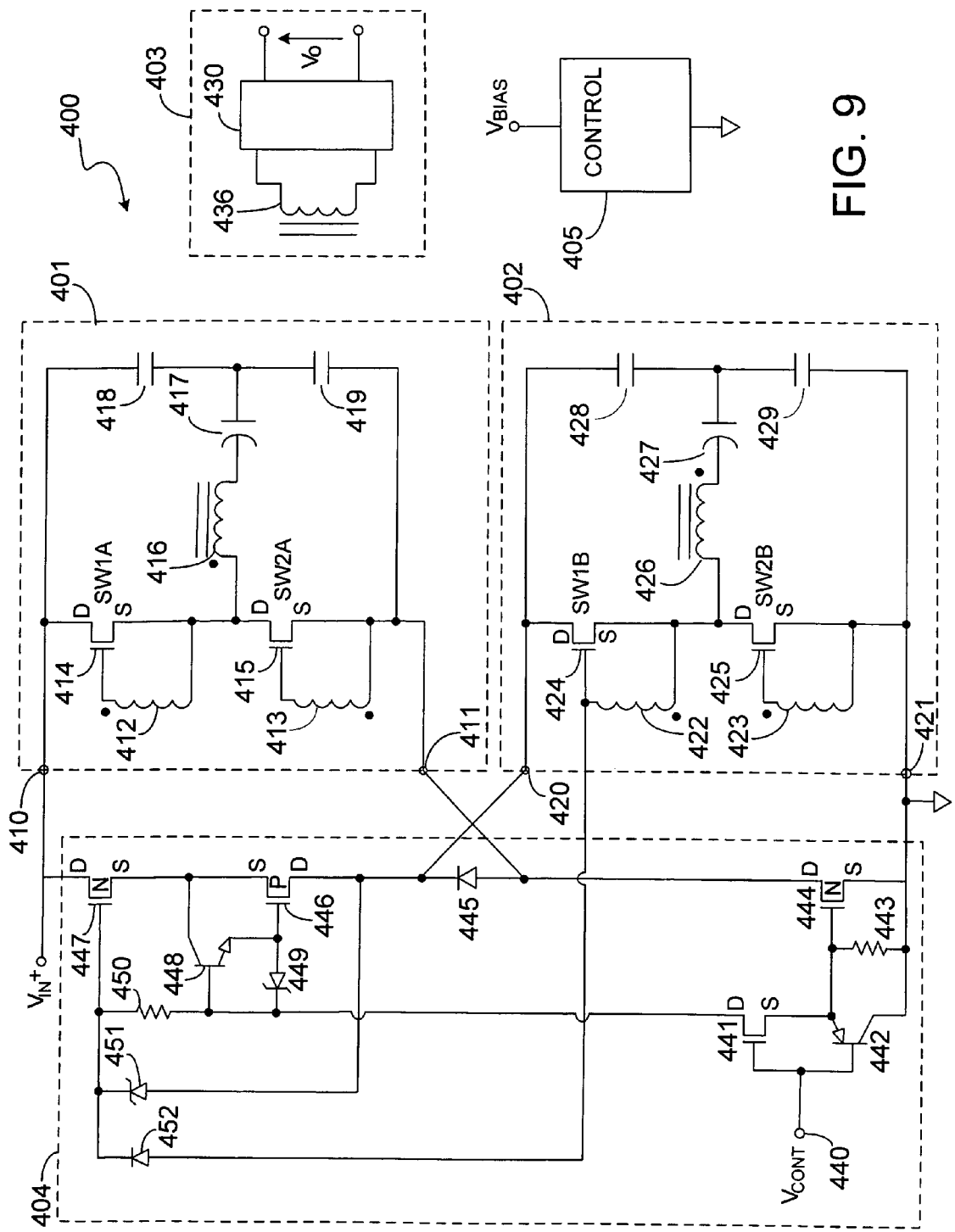
FIG. 9 shows an off line auto-ranging converter module topology with complementary half-bridge SAC input cells.
Figure 10:
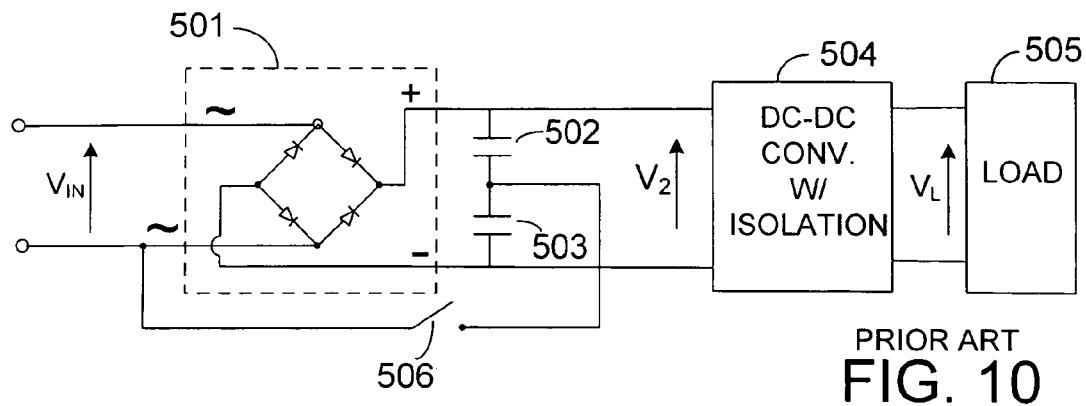
FIG. 10 shows a prior art off-line auto-ranging power supply.
Figure 11:
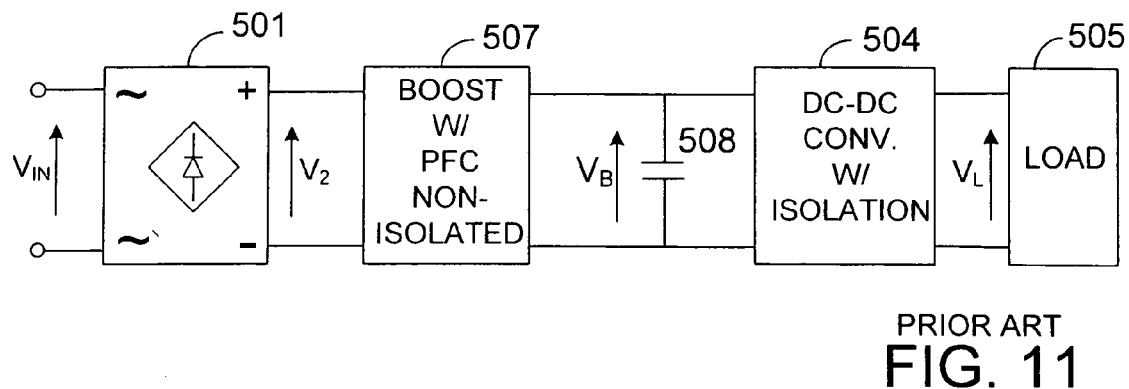
FIG. 11 shows a prior art off-line auto-ranging power supply with power factor correction.
Figure 12:
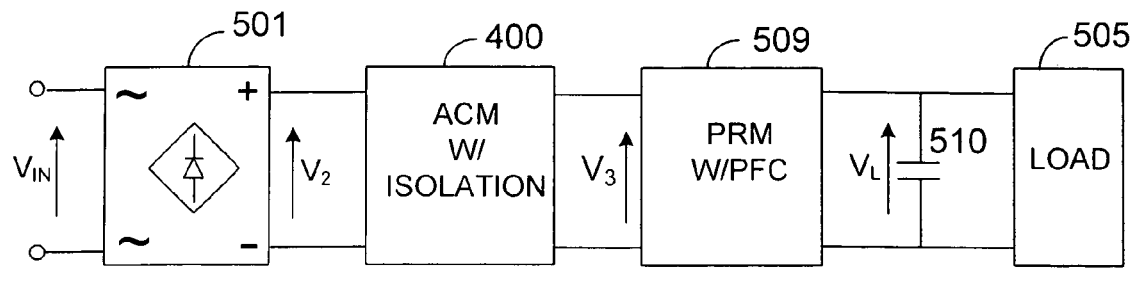
FIG. 12 shows an off-line auto-ranging power supply using an auto-ranging converter module cascaded with a power factor corrected power regulator module.

Referring to FIG. 12, an auto-ranging off-line power supply topology is shown including a full-wave rectifier (in this case a bridge rectifier) 501, an auto-ranging converter module ("ACM") 400, and a power regulator module 509. The ACM 400, which is discussed in more detail below in connection with FIG. 9, provides auto-ranging, voltage transformation, and isolation and may optionally provide regulation. The voltage, $V_2$, at the output of the rectifier 501 is a function of the AC input voltage, $V_{IN}$, and may therefore vary over a large range. For example, in auto-ranging off-line applications the RMS line voltage may vary between 85 and 275 VAC, RMS, corresponding to peak rectified line voltages in the range of 120V to 389V. In another application example, the RMS line voltage may vary over a narrower range between 100V and 240V. The ACM 400 may be configured to transform the relatively high peak rectified line voltage, $V_2$, to a relatively lower voltage, $V_3$, (e.g. having a peak value of 50V) allowing downstream capacitive energy storage, regulation, and PFC to be provided at the lower voltage. Better figure of merit switches may be used in the PFC and regulation circuitry while energy storage at the lower voltage may be safer.

Referring to FIG. 9, an integrated VTM array is shown adapted to provide the ACM functions of off-line auto-ranging voltage transformation and isolation. As shown in the figure, the ACM 400 includes two half-bridge input cells 401 and 402 and output cell 403 based upon the SAC converter topology. Preferably, the input cells may be complementary as discussed above in connection with FIG. 8. The input cells 401, 402 include primary windings 416, 426 magnetically coupled to secondary winding 436. In the embodiment shown, the input cells include a series resonant circuit including the primary winding and a resonant capacitor 417, 427. Primary switches 414, 415 and 424, 425 drive the resonant circuit with one half of the voltage applied across the cell input terminals 410, 411 and 420, 421. Capacitors 418, 419 and 428, 429 are scaled to provide filtering on a time scale that is large relative to the resonant frequency and small relative to the line frequency. Alternatively, full-bridge topologies may be used, eliminating capacitors 418, 419 and 428, 429 and replacing them with switches. Output circuitry 430 connected to the secondary winding 436 rectifies the secondary voltage and supplies a DC output voltage Vo for delivery to a load (not shown). A switching control circuit 405 operates the primary switches in a series of converter operating cycles using gate drive transformers 412, 413, and 422, 423 to turn the primary switches ON and OFF. Power for the switching control circuit, at a relatively low voltage, $V_{BIAS}$, may be derived from the input voltage, $V_{IN}$, through an auxiliary winding coupled to the input cells.

A configuration controller 404 is used to connect the input cells 410, 402 in a series and a parallel configuration to provide an auto-ranging function. A gate bias voltage is supplied from the gate drive transformer 422 of input cell 402 through diode 452. The gate bias voltage is sufficient, e.g. several volts, to ensure that transistor 424 is pulsed ON fully. As shown the gate bias voltage is referenced to the source of transistor 424. When transistor 424 is ON, its source terminal is essentially tied to the positive input terminal 420 causing the gate bias voltage to be referenced to the positive input terminal 420 of input cell 402. Terminal 420 will be essentially at $V_{IN}$ for the parallel connection and at $V_{IN}/2$ for the series connection. The gate bias voltage will provide sufficient drive to transistor 447 to ensure that it is fully ON in the parallel configuration.

With a sufficiently large positive voltage $V_{cont}$ applied to the control terminal 440, transistor 442 is OFF and transistor 441 is ON, driving the gate of transistor 444 positive and turning transistor 444 ON. Transistor 441 pulls the base of transistor 448 and the gate of p-channel MOSFET transistor 446 low, turning transistor 448 OFF and transistor 446 ON. With the gate bias voltage several volts above input terminal 420 and with transistor 446 ON, the gate of transistor 447 is driven above the source of transistor 447 turning it ON. With transistors 444, 446, and 447 ON, the input cells are connected in parallel across the input voltage, Vin. The parallel connection of the input cells allows each cell to share in the power delivered by the output cell 403 reducing the current carried by the primary switches.

While the voltage at the control terminal 440 remains below a predetermined threshold (e.g., below a value that causes the gate voltage of transistor 444 to drop below its gate threshold voltage), transistor 442 remains ON and transistor 441 remains OFF; transistor 448 turns ON holding the gate to source voltage of transistor 446 near zero keeping transistor 446 OFF. With transistors 446 and 444 OFF, transistor 447 will be OFF. With transistors 444, 446, and 447 OFF, the input cells are connected in series (through diode 445) across the input voltage, Vin. The series connection of the input cells divides the input voltage between the input cells reducing the voltage requirements of the primary switches.

Preferably, the peak line voltage may be sensed and used to set and latch the control signal $V_{cont}$ to prevent the integrated VTM array from reconfiguring the input cells as the voltage changes throughout the AC cycle. Alternatively, the configuration may be switched during the AC cycle for example when more than 2 input cells are provided. Circuitry for sensing the peak line voltage and delivering control signal $V_{cont}$ may be included in switching control circuit 405.

Although the ACM of FIG. 9 is shown using an integrated VTM array based upon the SAC topology, an ACM comprising an integrated converter array based upon other VTM or hybrid VTM-regulating topologies (e.g., PWM VTMs and PWM regulators) may also be used. For example, an integrated VTM array based upon a hard-switching PWM VTM topology having 2 input cells, an output cell, and a common transformer may be realized by omitting the resonant capacitors 417, 427 in FIG. 9. Alternatively, an ACM with regulation may be may realized using an integrated DC-DC converter array in which two or more primary cells are coupled through a common transformer to an output circuit. Although there may be an efficiency and EMI penalty as compared to the SAC topology, the integrated hard-switching PWM VTM array and the integrated DC-DC converter array may still provide some of the benefits of reduced voltage and current stresses on the primary switches.

In FIG. 12, the power regulator module ("PRM") connected to the output of the ACM 400 provides regulation for the power delivered to the load 505. Because the peak input voltage to the PRM is relatively low e.g., below 50 volts, and varies over a relatively narrow range, e.g. +/−25%, the PRM may use low voltage switches providing a higher figure of merit due to lower ON resistances and reduced gate capacitance. Because the ACM provides isolation, the PRM is preferably non-isolated, thus allowing further improvement in power density. Whereas a capacitive voltage doubler requires two bulk storage capacitors, only a single bulk storage capacitor, at the output of the PRM, is required in a system using an auto-ranging ACM. Additionally, for ACMs based upon a VTM architecture, the PRM may provide PFC (e.g., by controlling the PRM so that its input current approximately follows the sinusoidal waveform of the rectified input source) at a relatively low voltage, for example below 50 Volts, instead of at 400 Volts, as is typical in off-line systems. Because the energy density of commercially available filter capacitors rated at 50 volts and 400 volts are comparable, storing energy at the lower, isolated, voltage provides greater safety with virtually no impact on power density. In very low voltage applications, the auto-ranging VTM may step the line voltage down to 3-5 Volts and super capacitors may be used for energy storage. Although PFC may not generally be required in low power (e.g., less than 200 watt) systems, it may be provided in the ACM topology without the size and cost penalties of prior art systems.

In a preferred embodiment, an ACM may be operated over a total AC input line range of 80 VAC RMS to 275 VAC RMS (corresponding, e.g., to operating off both a nominal 110 VAC RMS line that varies over a low input line range from 80 VAC RMS to 138 VAC RMS, and a nominal 220 VAC RMS line that varies over a high input line range from 160 VAC RMS to 275 VAC RMS). When operating from the low input line range, the peak rectified voltage at the input to the ACM may vary over a range from 113 V PEAK to 195 V PEAK; when operating from the high input line range, the peak rectified voltage at the input to the ACM may vary over a range from 226 V PEAK to 388 V PEAK. Each of the input cells 410, 402 may have a K factor of 4. When the input cells are configured in series, the effective K factor will be 8; when the input cells are configured in parallel the effective K factor will be 4.

The "switchover threshold" of such an ACM may be set to be in the nominal center of the range of peak voltages, e.g. at 250 V PEAK. When operating from the low input line range, the peak rectified voltage at the input to the ACM will be lower than the switchover threshold, the control signal $V_{cont}$ will be set high, the input cells 401, 402 will be in parallel, the effective K factor will be 4 and the peak voltage at the output of the ACM will vary over a range between 28.3 VPEAK and 48.8 VPEAK; when operating from the high input line range, the peak rectified voltage at the input to the ACM will be higher than the switchover threshold, the control signal $V_{cont}$ will be set low, the input cells 401, 402 will be in series, the effective K factor will be 8 and the peak voltage at the output of the ACM will vary over a range between 28.3 VPEAK and 48.5 VPEAK. As a result, as the rectified input voltage to the ACM varies between 113 V PEAK and 388 V PEAK, the output of the ACM will deliver a voltage that varies approximately +/−27% about a nominal peak voltage of 38.5 V PEAK. In many commercial applications, such as AC adapters for notebook computers, the RMS line range is specified to be narrower (e.g., 100 VAC RMS to 240 VAC RMS), the rectified input voltage to the ACM will be narrower and the output of the ACM will vary less than +/−27%.

When operated from an AC line, the input to the VTM will be a time-varying waveform that varies between zero volts and the peak voltage of the AC line, at twice the frequency of the AC line. A VTM is generally capable of transforming input voltages essentially down to zero volts, provided that its internal control circuitry remains operational throughout the entire rectified line cycle. In preferred ACM embodiments, sufficient holdup (e.g., 10 msec) is provided in the $V_{BIAS}$ supply so that the switching control circuit 405 remains powered, and capable of driving the ACM switches, even as the rectified input voltage to the ACM goes to zero volts.

Figure 13:
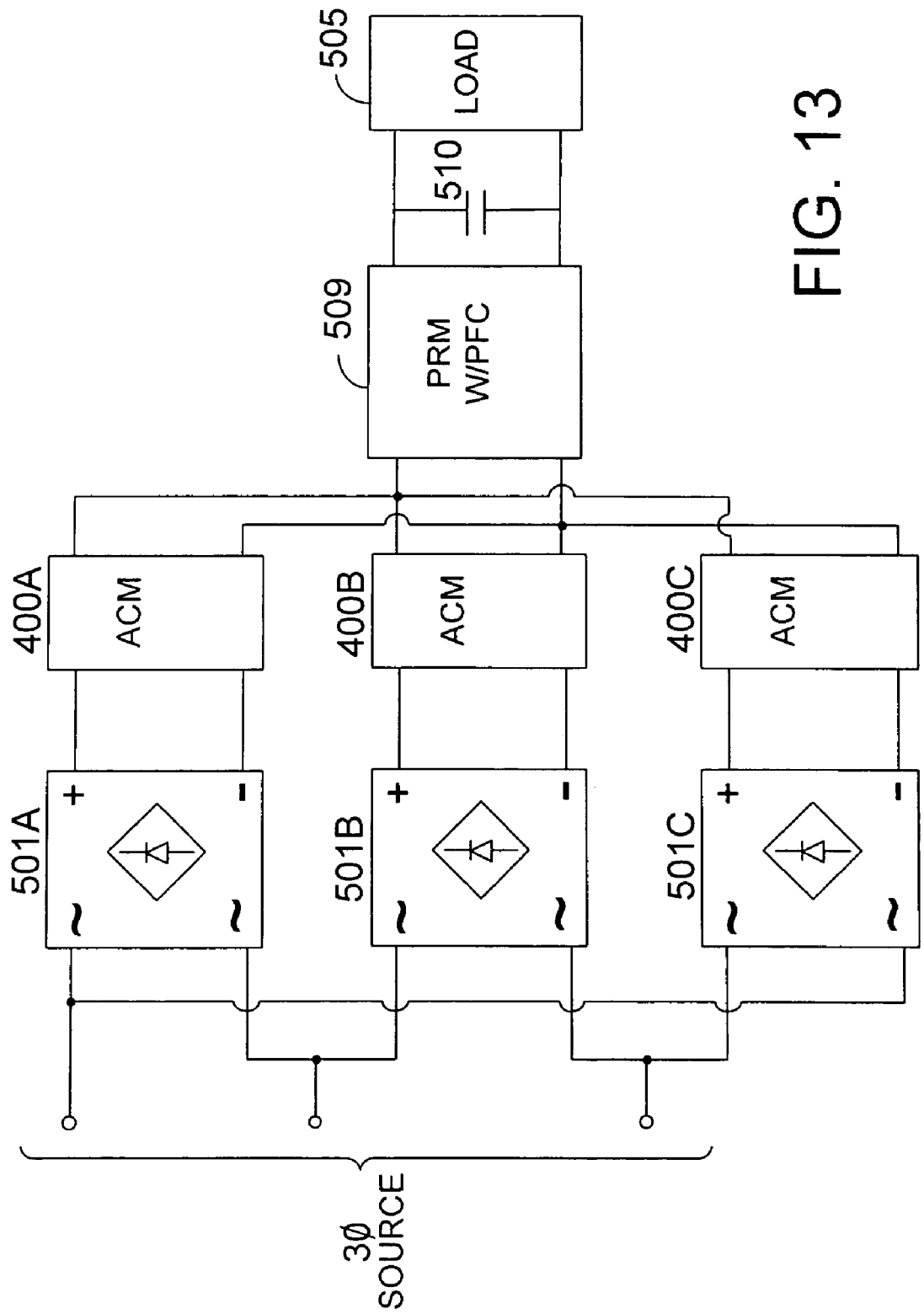
FIG. 13 shows an off-line auto-ranging power supply using auto-ranging converter modules cascaded with a power regulator module for use with a three-phase line.

The ACM topology may provide even greater power density and savings in three-phase off-line applications. Referring to FIG. 13, an example of an ACM delta configuration is shown. Three ACMs 400A-400C are connected via full-wave rectifiers 501A-501C between each of the three lines. Although a delta configuration is shown, the system may also be connected in a star or wye configuration. In either case, the outputs of the three ACMs may be connected in parallel to feed a single PRM or a parallel array of PRMs which may also provide PFC. This configuration has the advantage of maximizing the utility of PRMs increasing the power density even further.

Figure 14:
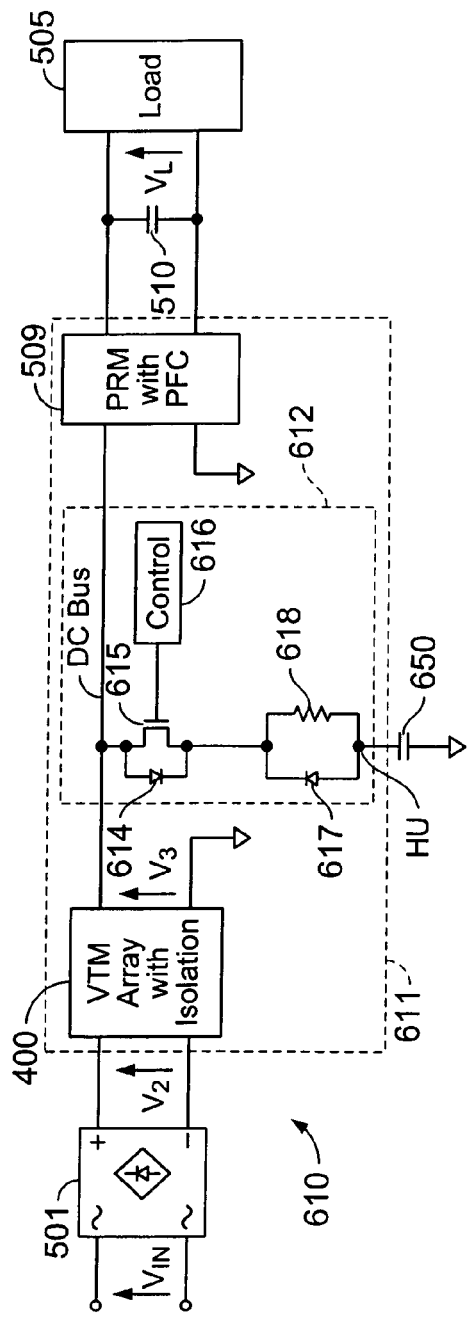
FIG. 14 shows an off-line auto-ranging power supply having an integrated auto-ranging converter module, low line hold-up circuit, and power-factor-correcting power-regulator module.

Another embodiment of an auto-ranging off-line power factor correcting power supply topology 610 is shown in FIG. 14. Similar to the power supply illustrated in FIG. 12, topology 610 includes a full-wave rectifier (e.g. a bridge rectifier) 501, an adaptive VTM array 400, and a PRM 509 with power factor correction. The adaptive VTM array 400, which is discussed in more detail above in connection with FIGS. 9 and 12, may provide auto-ranging, voltage transformation, and isolation. The PRM 509, also discussed above, may provide regulation and power factor correction and may preferably use the buck-boost topology described in the Buck-Boost Patent. The filter capacitor 510 at the output of the PRM 509 is required for filtering the pulsating output current of the power factor correcting PRM and supplying a DC voltage output to the load 505.

As shown in FIG. 14, the topology 610 additionally includes a hold-up circuit 612 and hold-up capacitor 650 connected between the VTM array 400 and the PRM 509. The hold-up circuit includes switch 615 and parallel unidirectional conducting device 614 in series with the parallel combination of resistance 618 and unidirectional conducting device 617. A MOSFET may be used for switch 615 allowing the intrinsic switch diode to serve as the unidirectional conducting device 614. As shown, the hold-up circuit provides an asymmetrical path between hold-up capacitor 650 and the bus voltage $V_3$. The hold-up circuit may include a controller 616 for operating switch 615.

The hold-up circuit 612 is used to store energy in the hold-up capacitor 650 by charging the capacitor during certain conditions e.g., normal line and load levels, and to supply power from the capacitor to the PRM input during other conditions e.g., during a line dropout or brownout. A high impedance charging path is provided between the DC bus (voltage $V_3$) and the hold-up capacitor 650 through unidirectional conducting device 614 and resistance 618. While switch 615 is off, the unidirectional conducting device 614 prevents the capacitor from discharging as the pulsating DC bus voltage $V_3$ falls back to zero volts during each half cycle of line frequency. Resistance 618 is set high enough to limit the charging current to a value that does not exceed the peak current capability of the adaptive VTM array 400 (e.g., when the system is initially turned on or following a hold-up operation). The hold-up capacitor 650 is charged to the peak value of the pulsating DC bus voltage, $V_3$.

After the hold-up capacitor 650 is charged to a voltage level sufficient to support the load, it may supply power to the PRM when a hold-up operation is necessary. When switch 615 is on, a low-impedance discharge path is provided between the hold-up capacitor 650 and the input of the PRM 509 through unidirectional conducting device 617 and switch 615. If a bi-directional topology, such as the SAC topology, is used in the adaptive VTM array 400, reverse power flow from the hold-up capacitor 650 to the AC line ($V_{in}$) is prevented by the input rectifier 501 during times when switch 615 is closed. The adaptive VTM may be disabled or the secondary switches in the VTM may be disabled while the hold-up capacitor supplies power to the PRM.

The hold-up circuit 612 is configured by controller 616 which is used to detect various circuit conditions and to turn switch 615 ON (to initiate hold-up operation) and OFF (to terminate hold-up operation). The controller 616 may preferably monitor several voltage levels in the circuit, including for example, the voltage, $V_H$ at the hold-up terminal (to monitor the state of charge of the hold-up capacitor), $V_2$ at the output of rectifier 501 (to determine the line level), $V_3$ at the output of the VTM array (to detect low line conditions), and $V_L$ at the PRM output (to monitor the load regulation). Other levels such as the PRM output current or load current may be monitored by the contoller 616 to optimize the hold-up function. Generally, the controller 616 will initiate a hold-up operation in response to an imminent threat of losing regulation of the load provided that the hold-up capacitor has sufficient charge to support the PRM. An example of such an imminent threat includes when the line voltage declines below the level required to support PRM operation e.g., during a line dropout or brownout. The controller 616 may compare the peak value of the bus voltage $V_3$ to a pre-determined threshold voltage to detect a low-line condition. Alternatively, the controller 616 may sense an error signal in the PRM regulation circuitry to determine when the PRM is approaching the limits of its ability to maintain load regulation. As the error moves to an extreme, such as the rail, a low-line condition may be present. The controller 616 generally turns switch 616 OFF terminating the hold-up operation either when the threat is removed e.g., the line voltage returns to within a normal operating range, or when the hold-up capacitor can no longer support the load i.e., the voltage $V_H$ across the hold-up capacitor 650, falls below a predetermined threshold. A microprocessor controller may be used to implement the above described functions of the hold-up circuit controller 616 in addition to other control functions such as controlling the power-up and power-down sequences of the power supply 610, including selectively enabling and disabling the VTM and PRM, controlling PFC in the PRM, and adaptively configuring the VTM in place of configuration controller 404 in FIG. 9.

As discussed above in connection with FIG. 12, the ACM may optionally be expanded to include the function of regulation. Accordingly, a preferred implementation of topology 610 employs a fully integrated power conversion module, PCM 611, which includes the adaptive VTM array 400, holdup circuit 612, and PRM 509 in a single module as shown by the broken line in FIG. 14. In the case where the topology provides PFC, the PCM may be called a power factor correction module ("PFM"). The use of module in the PCM and PFM nomenclature refers to a self-contained assembly that is installed as a unit and has terminals for establishing electrical connections to circuitry external to the module. The rectifier 501, hold-up capacitor 650, and filter capacitor 510 preferably are external to the PCM 611 package as discussed in more detail below.

Referring to FIGS. 19A, 19B, 19C, and 19D, a preferred package 690 for the module (PCM and PFM) 611 is shown. Package 690 is described in more detail in Vinciarelli, et al., "Power Converter Package And Thermal Management," U.S. patent application Ser. No. 10/303,613, filed Nov. 25, 2002 (incorporated here by reference). As shown, terminals 692, e.g. solder balls arranged in a ball grid array, of package 690 provide electrical connections for the inputs to the VTM array 400, the outputs of the PRM 509, and the hold-up circuitry terminal HU. Additional terminals may be provided for various other functions in the module. Connectors 691 provide interconnection between module terminals 692 and contacts 606 on a surface of printed circuit board ("PCB") 601. The connectors 691 are described in more detail in Vinciarelli, et al., "Surface Mounting A Power Converter," U.S. patent application Ser. No. 10/714,323, filed Nov. 14, 2003 (incorporated here by reference). As shown in FIG. 19D, connectors 691 allow the module 690 to be surface mount soldered to PCB 601 via solder connections 602. A 200 W fully integrated PCM with PFC for example may be realized in a "Double-VIC" package 690 measuring 32 mm wide by 43 mm long by 6 mm high.

Figure 15:
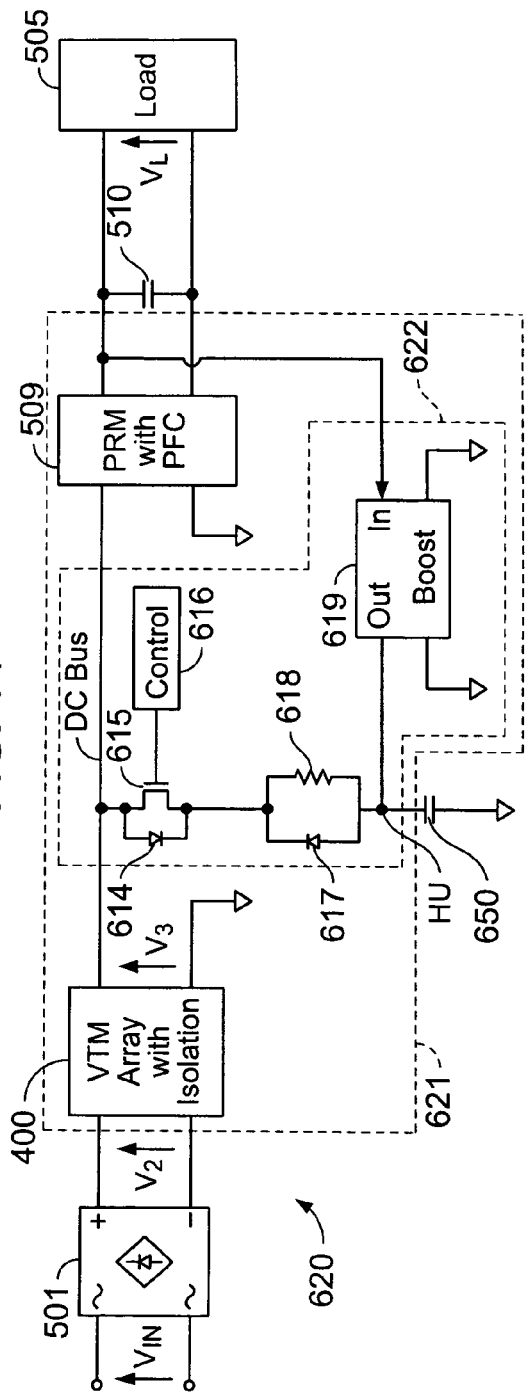
FIG. 15 shows an off-line auto-ranging power supply having an integrated auto-ranging converter module, low line hold-up circuit with boost converter, and power-factor-correcting power-regulator module.

Referring to FIG. 15, another embodiment of an autoranging off-line power factor correcting power supply topology 620 is shown. The topology 620, while similar to the topology 610 shown in FIG. 14 in that it comprises a full-wave rectifier (e.g. a bridge rectifier) 501, an adaptive VTM array 400, a PRM 509 with power factor correction, and a low-line hold-up circuit 622 and hold-up capacitor 650, additionally includes a low power boost converter 619 in the hold-up circuit 622. Preferably, the topology 620 employs a fully integrated PCM 621 that includes the adaptive VTM array, the hold-up circuit 622, and PRM 509 preferably packaged as shown in FIGS. 19A-D. Although the boost converter 619 is shown included in the hold-up circuit 622, and thus integrated in the PCM 621, it may also be external to the PCM 621.

The topology 620 also operates in a similar manner to the topology 610 in FIG. 14. The hold-up capacitor may be charged through the high impedance path (unidirectional conducting device 614 and resistance 618) to the peak voltage of the pulsating DC bus, $V_3$. However, the boost converter 619 charges the capacitor 650 to a higher voltage to maximize the energy storage in, and thus optimize the power density of, the hold-up capacitor. The boost converter may preferably be powered from the PRM output, instead of the pulsating bus voltage. When the controller 616 detects a low line condition, switch 615 is turned ON providing the low impedance path (via unidirectional conducting device 61) from the hold-up capacitor to the input of the PRM 509. The controller 616 further disables the boost converter 619 while the hold-up circuit is providing power to the load.

The boost converter improvement of topology 620 (FIG. 15) supports a higher power density (discussed more fully below) than is achieved with topology 610 (FIG. 14) by charging the hold-up capacitor 650 to a higher, optimum (in terms of power density) voltage level, consistent with the maximum input operating voltage rating of the PRM. In contrast the voltage level across the hold-up capacitor in topology 610 (FIG. 14) is dependent on the peak of the pulsating bus voltage, $V_3$, which varies with the AC line input voltage. The ratio of the optimum capacitor voltage to the peak of the pulsating bus voltage at the low end of the normal line input voltage operating range can be almost 2:1. The boost converter topological variation (620 in FIG. 15) therefore may allow an increase in power density by as much as a factor of 4 in the hold-up capacitor 650, which may be key to maximizing overall system density.

By relaxing the time constant for charging the hold-up capacitor (for example to 4 seconds or more), the boost converter 619 need process only a tiny fraction of the power rating of the PRM, allowing the boost converter 619 to be made small and inexpensive. For a typical example, the hold-up capacitor 650 may be sized so that it can provide holdup energy, and maintain the PRM input voltage at or above its minimum operating voltage, for 20 mS, corresponding to approximately 1 cycle of a 50 Hertz AC line. Using a 4 second charging time constant, the boost converter need process only about 0.5% (20 mS/4 S=0.005) of the power which the PRM processes. Therefore, in an application in which the PRM is rated to deliver 200 Watts, the boost converter may be a simple IC capable of delivering 1 Watt peak. Furthermore, the boost converter may be operated with a low duty cycle because the hold-up capacitor need be charged relatively infrequently.

The space required for a 1 Watt integrated circuit boost converter is much less than the space required for an electrolytic capacitor sized to provide 20 mS hold up at 200 W output power. For example, a typical 10,000 uF 50V capacitor (manufactured by Nichicon or Panasonic and available in a 1 inch diameter by 2 inch long cylindrical can) charged to approximately 31 Volts (corresponding to the peak bus voltage with an input voltage at the low end of the normal input voltage operating range) provides barely enough energy storage to provide 20 mS hold in at 200 W. Under these conditions, the power density of the hold-up capacitor is limited to approximately 100 W/in$^3$ which is low relative to the approximately 400 W/in$^3$ density of the PFM 621. However, by charging the same hold-up capacitor to an optimum voltage, e.g. 50V, the power density of the hold up function is cost-effectively boosted to 260 W/in$^3$ (more than double compared to the peak charging topology 610). To achieve even greater hold up density, a battery can be substituted for the hold up capacitor using a similar boost circuit to maintain the battery charge.

Figure 16:
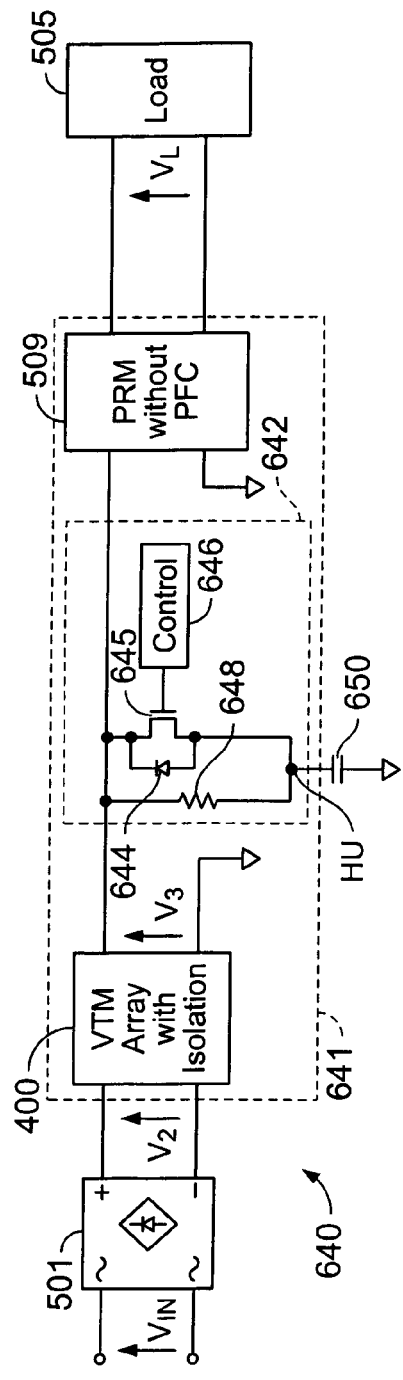
FIG. 16 shows an off-line auto-ranging power supply having an integrated auto-ranging converter module and non-power factor correcting power regulator module.

Referring to FIG. 16, an embodiment of an auto-ranging off-line AC input power supply topology 640 is shown. The topology 640 is similar to the topology 610 in FIG. 14 in that it comprises a full-wave rectifier (e.g. a bridge rectifier) 501, an adaptive VTM array 400, a PRM 509, and a low-line hold-up circuit 642 and hold-up capacitor 650. However, topology 640 differs in that it does not perform PFC and accordingly the filter capacitance may be moved from the output to the input of the PRM allowing integration of the filter and hold-up functions into a single hold-up capacitor 650. As with the topologies 610 and 620 of FIGS. 14 and 15, the adaptive VTM array 400, hold-up circuit 642, and PRM 509 of topology 640 may be integrated into a single fully integrated PCM 641 as shown by the broken line in FIG. 16 and packaged as shown in FIGS. 19A-D. Like the PFM example above, a 200 W fully integrated PCM without PFC for example may also be realized in a "Double-VIC" package measuring 32 mm wide by 42 mm long by 6 mm high.

Switch 645 is kept OFF until after the voltage across hold-up capacitor 650 reaches a predetermined level to avoid a large in-rush current. During power-up, resistance 648 limits the charge current for capacitor 650. Switch 645 is turned ON after the voltage across the hold-up capacitor reaches the predetermined level and remains ON thereafter. With switch 645 on, the hold up capacitor is charged to the peak voltage during each line half-cycle. The capacitance 650, which functions as a voltage smoothing filter, may generally be chosen to provide sufficient energy storage to support the load during low line conditions (as discussed above). The controller 646 may turn switch 645 OFF when the voltage across capacitor 650 falls below a predetermined threshold, in preparation for another power-on charging cycle. As discussed above, controller 646 functions may be implemented using a microprocessor and may also include enabling and disabling the PRM and VTM.

Figure 17:
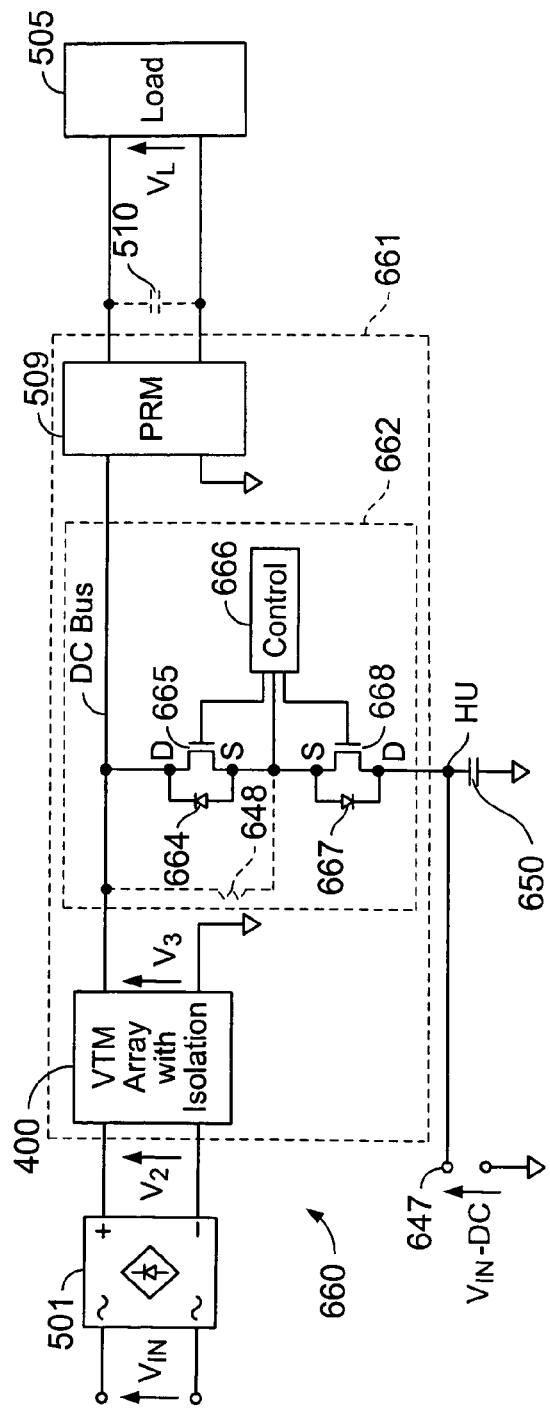
FIG. 17 shows an alternate hold-up circuit for use in power factor correcting and non-power factor correcting topologies.

Preferably with slight modifications, a DC input connection may be provided for topologies 610, 620, and 640, allowing the power supply to be used in many commercial applications in which operation from either an AC line or a DC source is desirable, e.g., consumer electronics and notebook computers. Referring to FIG. 17, topology 660 is shown as a generalized example of both PFC and non-PFC topologies. Capacitor 510, which is generally necessary for PFC topologies but not required for non-PFC topologies, is therefore shown in broken lines, the PRM 509, which may or may not provide PFC, omits the with PFC ("w/PFC") or without PFC ("w/o PFC") labels, and the boost circuit 619 (FIG. 15) is not shown but may be added to the PFC version of topology 660. In other words, the hold-up circuit 662 may be adapted for use in the PFC topologies 610 and 620, or in the non-PFC topology 640.

As shown, a DC input 647 for connection to an external DC source may be connected to the hold-up ("HU") terminal of the hold-up circuit 662. A hold-up capacitor 650 may also be connected to the HU terminal. Hold-up circuit 662 differs from the previously discussed hold-up circuits in the use of a bidirectional switch network including MOSFET switches, 665 and 668, connected in series with intrinsic diodes, 664 and 667 respectively, poled to block current in both directions. In both PFC and non-PFC configurations, the inrush current during power up may be limited by switch 665 under control of control circuit 666 thus, possibly, replacing resistance 618 in FIGS. 14-15 or resistance 648 in FIG. 16. A resistance 648 (shown in broken lines) optionally may be provided to carry some or all of the charging current. When a low AC line condition or other condition necessitating hold-up energy is detected in either configuration, the controller may turn ON switches 665 and 668 to connect the external DC source or hold-up capacitor to the PRM input. The hold-up circuits 612 (FIG. 14), 622 (FIG. 15), and 642 (FIG. 16) may be implemented using a bidirectional switch network for example as shown in the hold-up circuit 662 of FIG. 17. The controller 666 may derive start up power from either the DC or AC source. As with the topologies 610, 620, and 640 of FIGS. 14, 15, and 16, the adaptive VTM array 400, hold-up circuit 662, and PRM 509 of topology 660 may be integrated into a single fully integrated PCM or PFM 661 as shown in FIG. 17 preferably packaged as shown in FIGS. 19A-D. A 200 W fully integrated PCM 661 with or without PFC may also be realized in a module package as shown in FIGS. 19A-D measuring 32 mm wide by 42 mm long by 6 mm high.

In applications requiring an external DC input and a hold-up capacitor, it may be desirable to provide a switched connection between the hold-up capacitor and the DC input terminal. For example, a unidirectional conduction device or diode (not shown) may be used to prevent reverse current flow from the hold-up terminal to the DC input terminal.

Alternatively, in addition to a hold-up circuit and hold-up capacitor, a bidirectional switch network (of the type shown in FIG. 17) may be used to connect the DC input terminal to the DC bus.

Figure 18:
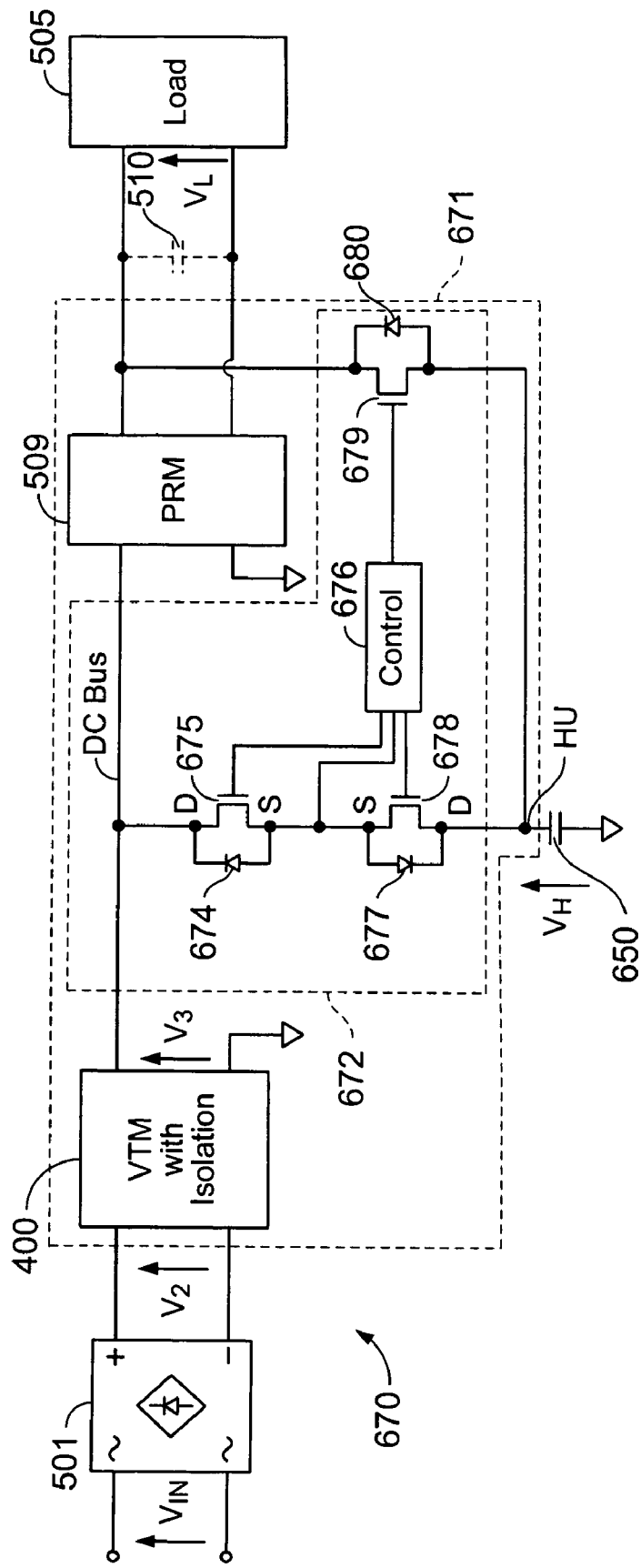
FIG. 18 shows an alternate hold-up circuit for use in power factor correcting topologies.

Referring to FIG. 18, an off-line power factor correcting power supply topology 670 is shown with a hold-up circuit 672. Topology 670 is shown as a generalized example for both adaptive and non-adaptive VTM topologies. Therefore, the VTM 400 is not labeled as "adaptive." The VTM 400 provides voltage transformation and isolation and preferably provides for adaptive voltage transformation as well. The PRM 509 provides PFC and provides boost power conversion and preferably provides buck-boost power conversion. Like hold-up circuit 662 (FIG. 17), hold-up circuit 672 includes a bidirectional hold-up switch comprising switches 675 and 678. However, unlike hold-up circuit 662 (FIG. 17), hold-up circuit 672 also includes a smoothing switch 679 connected between the PRM output and the hold-up terminal HU. Smoothing switch 679 may be a unipolar switch as shown in FIG. 18 with the intrinsic diode poled to conduct current from the hold-up capacitor to the load. Alternatively, smoothing switch 679 may be implemented as a bidirectional switch. The addition of smoothing switch 679 allows the hold-up capacitor 650 to also perform as the smoothing capacitor 510 (which is generally necessary for PFC topologies). Thus hold-up circuit 672 may be used to eliminate one of the relatively low (as compared to the PFM) power density capacitors 510 or 650 allowing additional increases in overall power density. Smoothing capacitor 510 is therefore shown in broken lines in FIG. 18. Because the hold-up capacitor 650 in topology 670 is connected across the load as a smoothing capacitor, topology 670 is not compatible with the boost circuit 619 of FIG. 15 and the hold up capacitor is not charged to voltages greater than the load voltage.

During normal load and line operating conditions and during power up, the hold-up circuitry is configured for "smoothing" the PRM output. In the "smoothing" configuration the bidirectional hold-up switch is off, the smoothing switch is ON connecting the hold-up capacitor 650 across the PRM output, and the PRM is configured to perform PFC. Thus the hold-up capacitor 650 functions as the smoothing capacitor 510 for the PRM output. During power up, the PRM provides current limiting to control the inrush current in to capacitor 650. During a line drop out or other condition requiring hold-up energy, the hold-up circuit is configured for "hold-up." In the hold-up configuration, the smoothing switch is turned off, the bidirectional hold-up switch is turned ON connecting the hold-up capacitor 650 to the PRM input, and the PFC function is disabled avoiding a pulsating output and the need for a smoothing capacitor across the PRM output. In the hold-up configuration, the PRM regulates the load voltage boosting the hold-up voltage which decays from a starting voltage approximately equal to the load voltage as the capacitor 650 discharges. When the line voltage returns or the other condition is removed, the hold-up circuit may be returned to the smoothing configuration.

In the event that the capacitor 650 is deeply discharged during the hold-up period, a "recharge transition" configuration may be used to avoid disrupting the load regulation until the capacitor 650 is recharged to an appropriate level, e.g. a level approximating the load voltage or at which the PRM can maintain regulation while the capacitor 650 charges. In the re-charge transition configuration, the smoothing switch may be operated in a linear mode to limit the in-rush current from the PRM output to the capacitor 650. After the appropriate voltage level is reached, the smoothing switch may be closed returning to the smoothing configuration.

Depending upon the relationship between the DC bus voltage and the load voltage, the capacitor 650 may be at least partially charged using either the hold-up configuration (in which the hold-up switch is on) or a modified hold-up configuration (in which the hold-up switch limits current e.g. as described above) prior to or instead of the recharge transition configuration discussed above. In either case, care must be taken to prevent the capacitor 650 from being charged to a voltage greater than the maximum load voltage.

Like controllers 616, 646, and 666 discussed above, controller 676 may monitor voltages $V_3$, $V_H$ and $V_L$ to configure the hold-up circuit (hold-up switches 675 and 678 and smoothing switch 679) and also may be used to configure the PRM (enable/disable the PRM and enable/disable the PFC in the PRM) and the VTM (enable/disable the VTM; configure the adaptive array if used). The controller 676 may also monitor voltage $V_2$ as part of a feed forward control loop. The PFM 671 may also be realized in package 690 as shown in FIG. 19A-19D.

The bulk energy storage capacitors in topologies 610, 620, 640, 660, and 670 is provided at a low voltage that is isolated from the AC line. Additionally, the PCM topologies do not require substantial energy storage in the module or even near the module. This allows the hold up or smoothing capacitor to be separated from the power conversion module to provide breakthrough packaging options. For example, the PCM is so small that it may be enclosed within a wall plug. The hold-up capacitor or battery 650 does not need to be near the PCM, is safely isolated from the AC line and may be easily enclosed in the electronic equipment for which power is being supplied. Using a notebook computer application as an example, the PCM topologies may be used to eliminate the ubiquitous external brick AC adapter.

A number of embodiments of the invention have been described. Nevertheless, it will be understood that various modifications may be made without departing from the spirit and scope of the invention. For example, it is not required that resonant capacitances $C_R$ and inductances $L_R$ be included in each of the SAC input cells, as is shown in FIG. 4; it is only necessary that at least one resonant capacitance and resonant inductance be provided (see, e.g., the integrated array of FIG. 6 in which a single resonant capacitance, shown in the uppermost primary cell and labeled $C_R$, is used). Although full bridge cells are shown in FIG. 4, the input cells may comprise any SAC configuration (e.g., full bridge, half bridge, push-pull). Different types of input cells may be combined in an adaptive array SAC. For example, a full-bridge input cell may be adaptively connected in series with a half-bridge input cell. Furthermore, power-sharing sub-arrays of VTMs and/or SACs may be configured in adaptive arrays to provide increased power capacity. The integrated adaptive array also may be used in other converter topologies to provide an adjustable transformer turns ratio, which in the case of a VTM provides an adjustable voltage transformation ratio. Accordingly, other embodiments are within the scope of the following claims.

What is claimed is:

1. A method of converting power from an AC source for delivery to a system including a load, the method comprising:

providing a power converter module ("PCM") having input terminals for receiving power from the source, output terminals for delivering power to a load at a regulated DC voltage, and power conversion circuitry, the PCM being a self-contained assembly adapted to be installed as a unit;

the power conversion circuitry comprising DC-DC voltage transformation ("VT") circuitry and power regulation ("PR") circuitry;

the VT circuitry having a VT input connected to the input terminals and a VT output for delivering power to the PR circuitry and having DC-DC switching power conversion circuit adapted to deliver a DC output voltage at the VT output that is an essentially fixed fraction of and galvanically isolated from the DC voltage delivered to the VT input;

the PR circuitry having an output connected to the output terminals and providing output regulation;

providing a capacitive energy storage component for the power conversion circuitry, the capacitive energy storage component being isolated from the source and external to the PCM.

2. The method of claim 1 wherein the VT circuitry further comprises an integrated adaptive converter array having a first input cell and a second input cell, each input cell having a respective number, $P_x$, of turns, an output cell having a respective number, $S_x$, of turns, magnetic coupling between the turns to form a transformer common to the first and second input cells and the output cell; and control circuitry for configuring the input cells in a parallel connection for operation at a low line voltage and in a series connection for operation at a high line voltage.

3. The method of claim 1 wherein the VT circuitry further comprises an array of two or more voltage transformation circuits, each voltage transformation circuit having an input, an output, and a substantially fixed voltage transformation ratio, $K=V_{out}/V_{in}$, over the normal operating range, where $V_{in}$ is the voltage across the respective voltage transformation circuit input and $V_{out}$ is the voltage across the respective voltage transformation circuit output, and providing isolation between its input and its output; and control circuitry for configuring the voltage transformation circuits in a parallel connection for operation at a low line voltage and in a series connection for operation at a high line voltage.

4. The method of claim 1 wherein the PR circuitry further comprises a buck-boost converter with PFC circuitry.

5. The method of claim 1 wherein the power conversion circuitry further comprises a hold-up switch connected between a hold-up terminal and the PR input and a smoothing switch connected between the hold-up terminal and the PR output; and wherein the PR circuitry further comprises power factor correction circuitry, the PCM requiring a single external capacitive energy storage component connected to the hold-up terminal.

6. The method of claim 1 wherein the power conversion circuitry further comprises a hold-up switch connected between a hold-up terminal and the PR input and the capacitive energy storage component is connected to the hold-up terminal to provide power to the PR input.

7. The method of claim 1 wherein the PR circuitry further comprises power factor correction circuitry, and the external capacitive energy storage component is connected to the PR output as a smoothing capacitor.

8. A method of converting power from an AC source for delivery to a system including a load, the method comprising:

providing a power converter having an input for receiving power from the source, an output for delivering power to a load at a regulated DC voltage, and power conversion circuitry;

the power conversion circuitry comprising DC-DC voltage transformation ("VT") circuitry and power regulation ("PR") circuitry;

the VT circuitry having a VT input connected to the power converter input and a VT output for delivering power to the PR circuitry and further comprising DC-DC switching power conversion circuitry adapted to deliver a DC output voltage at the VT output that is an essentially fixed fraction of the DC voltage delivered to the VT input;

the PR circuitry having a PR output connected to the power converter output and power regulation circuitry providing output regulation;

providing capacitive energy storage for the power conversion circuitry, wherein a majority of the capacitive energy storage is provided on a side of an isolation boundary opposite of the source.

9. The method of claim 8 wherein the VT circuitry further comprises an integrated adaptive converter array having a first input cell and a second input cell, each input cell having a respective number, $P_x$, of turns, an output cell having a respective number, $S_x$, of turns, magnetic coupling between the turns to form a transformer common to the first and second input cells and the output cell; and control circuitry for configuring the input cells in a parallel connection for operation at a low line voltage and in a series connection for operation at a high line voltage.

* * * * *

UNITED STATES PATENT AND TRADEMARK OFFICE
CERTIFICATE OF CORRECTION

PATENT NO. : 7,408,795 B2
APPLICATION NO. : 11/110091
DATED : August 5, 2008
INVENTOR(S) : Patrizio Vinciarelli It is certified that error appears in the above-identified patent and that said Letters Patent is hereby corrected as shown below:

Column 1, line 51, delete "foams" and insert --forms--, therefor;

Column 2, line 23, delete "Wanderfeldrohren" and insert --Wanderfeldröhren--, therefor;

Column 3, line 9, delete "incrporated" and insert --incorporated--, therefor;

Column 8, line 17, delete "AVTM" and insert --A VTM--, therefor;

Column 8, line 35, delete " $V_{i_n}$ " and insert --$V_{in}$--, therefor;

Column 8, line 52, delete "Vin" and insert --$V_{in}$--, therefor;

Column 9, line 1, delete "Vin" and insert --$V_{in}$--, therefor;

Column 11, line 10, delete "Cr" and insert --$C_R$--, therefor;

Column 12, line 20 (approx.), delete "turns" and insert --turns,--, therefor;

Column 14, line 54, delete "Vin" and insert --$V_{in}$--, therefor;

Column 14, line 67, delete "Vin" and insert --$V_{in}$--, therefor;

Column 17, line 42, delete "6150N" and insert --615 ON--, therefor;

Column 17, line 51, delete "contoller" and insert --controller--, therefor;

Column 19, line 7, delete "61)" and insert --617)--, therefor;

Column 19, line 53, delete "in" and insert --up--, therefor;

Column 21, line 59, delete "in to" and insert --into--, therefor;

UNITED STATES PATENT AND TRADEMARK OFFICE
CERTIFICATE OF CORRECTION

PATENT NO. : 7,408,795 B2
APPLICATION NO. : 11/110091
DATED : August 5, 2008
INVENTOR(S) : Patrizio Vinciarelli It is certified that error appears in the above-identified patent and that said Letters Patent is hereby corrected as shown below:

Column 23, line 22, in Claim 1, delete "circuit" and insert --circuitry--, therefor Signed and Sealed this Seventeenth Day of February, 2009

JOHN DOLL
*Acting Director of the United States Patent and Trademark Office*